(12) United States Patent
Chen et al.

(10) Patent No.: US 11,262,992 B2
(45) Date of Patent: *Mar. 1, 2022

(54) HARDWARE ACCELERATION METHOD, COMPILER, AND DEVICE

(71) Applicant: Huawei Technologies Co., Ltd., Shenzhen (CN)

(72) Inventors: Jian Chen, Nanjing (CN); Hong Zhou, Nanjing (CN); Xinyu Hu, Nanjing (CN); Hongguang Guan, Shenzhen (CN); Xiaojun Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 28 days.

This patent is subject to a terminal disclaimer.

(21) Appl. No.: 16/688,744

(22) Filed: Nov. 19, 2019

(65) Prior Publication Data
US 2020/0089480 A1 Mar. 19, 2020

Related U.S. Application Data

(63) Continuation of application No. 15/856,628, filed on Dec. 28, 2017, now Pat. No. 10,558,443, which is a
(Continued)

(30) Foreign Application Priority Data

Jun. 30, 2015 (CN) .......................... 201510373054.7

(51) Int. Cl.
*G06F 8/41* (2018.01)
*G06F 9/38* (2018.01)
(Continued)

(52) U.S. Cl.
CPC ............ *G06F 8/453* (2013.01); *G06F 8/4441* (2013.01); *G06F 8/452* (2013.01); *G06F 9/3836* (2013.01); *G06F 9/4552* (2013.01); *G06F 15/163* (2013.01)

(58) Field of Classification Search
CPC .......... G06F 9/3836; G06F 8/45; G06F 8/453; G06F 8/4441; G06F 8/452; G06F 9/4552; G06F 15/163
See application file for complete search history.

(56) References Cited

U.S. PATENT DOCUMENTS 5,151,991 A * 9/1992 Iwasawa ................. G06F 8/452
717/150
6,292,938 B1 9/2001 Sarkar et al.
(Continued)

FOREIGN PATENT DOCUMENTS

| CN | 1975753 A | 6/2007 |
| CN | 102713846 A | 10/2012 |
| CN | 104102474 A | 10/2014 |

OTHER PUBLICATIONS

Gilbert C. Sih et al., "A Compile-Time Scheduling Heuristic for Interconnection-Constrained Heterogeneous Processor Architectures", [Online], pp. 175-187, [Retrieved from INterent on Jul. 29, 2021], <https://ieeexplore.ieee.org/stamp/stamp.jsp?tp=&arnumber=207593> (Year: 1993).*

(Continued)

*Primary Examiner* — Ziaul A Chowdhury
(74) *Attorney, Agent, or Firm* — Conley Rose, P.C.

(57) ABSTRACT

A hardware acceleration method includes: obtaining compilation policy information and a source code, where the compilation policy information indicates that a first code type matches a first processor and a second code type matches a second processor, analyzing a code segment in the source code according to the compilation policy informa-
(Continued)

tion, determining a first code segment belonging to the first code type or a second code segment belonging to the second code type, compiling the first code segment into a first executable code, sending the first executable code to the first processor, compiling the second code segment into a second executable code, and sending the second executable code to the second processor.

26 Claims, 13 Drawing Sheets

Related U.S. Application Data continuation of application No. PCT/CN2016/087051, filed on Jun. 24, 2016.

(51) Int. Cl.
*G06F 9/455* (2018.01)
*G06F 15/163* (2006.01)

(56) References Cited

U.S. PATENT DOCUMENTS

| | | | |
|---|---|---|---|
| 6,341,371 B1 | 1/2002 | Tandri | |
| 6,438,747 B1 | 8/2002 | Schreiber et al. | |
| 6,507,947 B1* | 1/2003 | Schreiber | G06F 8/452 717/160 |
| 6,772,415 B1 | 8/2004 | Danckaert et al. | |
| 8,812,481 B2 | 8/2014 | Zuzarte et al. | |
| 8,997,073 B2 | 3/2015 | Ravi et al. | |
| 9,983,857 B2 | 5/2018 | Powers et al. | |
| 2004/0083455 A1 | 4/2004 | Gschwing et al. | |
| 2007/0038987 A1* | 2/2007 | Ohara | G06F 8/45 717/151 |
| 2008/0115216 A1 | 5/2008 | Barron et al. | |
| 2008/0263323 A1 | 10/2008 | Mould et al. | |
| 2010/0174876 A1 | 7/2010 | Kasahara et al. | |
| 2011/0225572 A1 | 9/2011 | Stoicescu et al. | |
| 2012/0254551 A1 | 10/2012 | Kasahara et al. | |
| 2012/0290763 A1 | 11/2012 | Li | |
| 2013/0125104 A1 | 5/2013 | Valluri et al. | |
| 2013/0191817 A1* | 7/2013 | Vorbach | G06F 15/7807 717/150 |
| 2014/0304490 A1 | 10/2014 | Toyama et al. | |
| 2014/0380289 A1* | 12/2014 | Kalogeropulos | G06F 8/4441 717/152 |
| 2015/0052331 A1 | 2/2015 | Dhurjati et al. | |
| 2015/0286491 A1* | 10/2015 | Anyuru | G06F 8/48 717/148 |
| 2016/0085530 A1 | 3/2016 | Gonzalez | |
| 2016/0103677 A1* | 4/2016 | Melski | G06F 9/5038 717/120 |
| 2016/0275043 A1 | 9/2016 | Grochowski et al. | |
| 2016/0371081 A1 | 12/2016 | Powers et al. | |
| 2017/0123775 A1 | 5/2017 | Xu et al. | |

OTHER PUBLICATIONS

Michael D. Linderman, "A Programming Model and Processor Architecture for Heterogeneous Multicore Computers", [Online], pp. 1-24, [Retrieved from Internet on Jul. 29, 2021], <https://www.proquest.com/openview/a6ed39c3742d16f756a6482bb2502901/1?pq-origsite=gscholar&cbl=18750> (Year: 2009).*

Office Action, dated Dec. 29, 2018, in Chinese Application No. 201510373054.7 (10 pp.).

International Search Report dated Sep. 29, 2016 in International Application No. PCT/CN2016/087051, 8 pages.

Written Opinion of the International Searching Authority dated Sep. 29, 2016, in International Application No. PCT/CN2016/087051, 7 pages.

Damschen, M., et al., "Transparent Offloading of Computational Hotspots from Binary Code to Xeon Phi," Mar. 9, 2015, pp. 1078-1083, XP032765970, 6 pages.

Wang Shuo,"Research on Hardware Acceleration for String Pattern Matching",University of science and technology of China,2009,with an English abstract, total 118 pages.

Debbabi, M., et al, "Armed E-Bunny: A Selective Dynamic Compiler for Embedded Java Virtual Machine Targeting ARM Processor," ACM Symposium on Applied Computing, Mar. 13-17, 2005. 5 pages.

* cited by examiner

HARDWARE ACCELERATION METHOD, COMPILER, AND DEVICE

CROSS-REFERENCE TO RELATED APPLICATIONS

This application is a continuation application of U.S. patent application Ser. No. 15/856,628 filed on Dec. 28, 2017, which is a continuation application of International Patent Application No. PCT/CN2016/087051 filed on Jun. 24, 2016, which claims priority to Chinese Patent Application No. 201510373054.7 filed on Jun. 30, 2015. All of the aforementioned patent applications are hereby incorporated by reference in their entireties.

TECHNICAL FIELD

The present disclosure relates to the field of computer technologies, and in particular, to a hardware acceleration method, a compiler, and a device.

BACKGROUND

Source code is also referred to as a source program sometimes, and is a non-compiled program instruction sequence that is written according to specific program design language specifications. Therefore, the source code is a series of human-readable computer language instructions. In a modern program language, an ultimate objective of computer source code is to translate a human-readable program instruction sequence into a computer-executable binary instruction. This process is referred to as compilation, and is accomplished using a compiler.

Based on the foregoing description, a current code compilation and execution procedure is as follows. After obtaining source code, a compiler compiles the source code into target code, and then sends the target code to hardware that executes the code, such as a central processing unit (CPU). The CPU executes the target code to obtain an execution result.

However, code execution efficiency in the foregoing solution is relatively low.

SUMMARY

Embodiments of the present disclosure provide a hardware acceleration method, a compiler, and a device, to improve code execution efficiency and implement hardware acceleration.

A first aspect of the embodiments of the present disclosure provides a hardware acceleration method, including obtaining, by a compiler, compilation policy information and source code, where the compilation policy information indicates that a first code type matches a first processor and a second code type matches a second processor, analyzing, by the compiler, a code segment in the source code according to the compilation policy information, determining a first code segment belonging to the first code type or a second code segment belonging to the second code type, compiling, by the compiler, the first code segment into first executable code, sending the first executable code to the first processor, compiling the second code segment into second executable code, and sending the second executable code to the second processor.

With reference to an implementation of the first aspect, in a first optional implementation, sending the second executable code to the second processor includes sending, by the compiler, the second executable code to the second processor using a scheduling manager, or adding, by the compiler to the second executable code, instruction information for calling the second processor, and sending the second executable code to the first processor using a scheduling manager such that the first processor sends the second executable code to the second processor after obtaining the instruction information.

With reference to the implementation of the first aspect, in a second optional implementation, the first processor is a CPU, the second processor is a field-programmable gate array (FPGA), and analyzing, by the compiler, a code segment in the source code according to the compilation policy information, and determining a first code segment belonging to the first code type or a second code segment belonging to the second code type includes collecting, by the compiler, statistics about a quantity of loop execution times of the code segment in the source code and/or execution duration of the CPU; and if a parameter obtained by means of statistics collection exceeds a first preset threshold, determining that the code segment belongs to the second code segment, or if the parameter obtained by means of statistics collection does not exceed the first preset threshold, determining that the code segment belongs to the first code segment; or comparing, by the compiler, the code segment in the source code with a feature rule of the second code segment; and if the code segment in the source code matches the feature rule of the second code segment, determining that the code segment is the second code segment, or if the code segment in the source code does not match the feature rule of the second code segment, determining that the code segment is the first code segment; or reading, by the compiler, acceleration identifier information in the source code, and determining, according to an indication of the acceleration identifier information, that code in the source code belongs to the first code segment or the second code segment.

With reference to the second optional implementation of the first aspect, in a third optional implementation, collecting, by the compiler, statistics about a quantity of loop execution times of the code segment in the source code and/or execution duration of the CPU includes calling, by the compiler, a statistics instruction set to determine the quantity of loop execution times of the code segment in the source code and/or the execution duration of the CPU using function code in the source code, or obtaining, by the compiler, a periodically-collected code execution statistics report to determine the quantity of loop execution times of the code segment in the source code and/or the execution duration of the CPU.

With reference to the first aspect, or the first, the second, or the third optional implementation of the first aspect, in a fourth optional implementation, if a priority of a process corresponding to the second code segment is higher than a priority of a process corresponding to executable code being executed in the second processor, before sending the second executable code to the second processor, the method further includes: if a busy degree of the second processor is higher than a second preset threshold, stopping the executable code being executed in the second processor compiling a code segment corresponding to the executable code being executed in the second processor into executable code matching the first processor, and sending the executable code matching the first processor to the first processor.

With reference to the first aspect, or the first, the second, or the third optional implementation of the first aspect, in a fifth optional implementation, if the first code segment belongs to a main code segment, and the second code segment is subordinate to the main code segment, the method further includes adding an interaction instruction to the first executable code and the second executable code such that the second processor returns an execution result of the second executable code to the first processor.

A second aspect of the embodiments of the present disclosure provides a hardware acceleration method, including obtaining, by a compiler, compilation policy information and source code, where the compilation policy information indicates that a first code type matches a first processor and a second code type matches a second processor, compiling, by the compiler according to the compilation policy information, a code segment in the source code into first executable code matching the first processor, and sending the first executable code to the first processor, and if receiving first execution information that is obtained by means of statistics collection by the first processor and that is of the first executable code, and determining, according to the first execution information, that a code segment corresponding to the first executable code matches the second processor, compiling the code segment corresponding to the first executable code into second executable code, and sending the second executable code to the second processor.

With reference to an implementation of the second aspect, in a first optional implementation, after sending the second executable code to the second processor, the method further includes receiving, from the second processor, second execution information of executing the second executable code, and if a matching degree between the second processor and a code segment corresponding to the second executable code is lower than an expected value according to the second execution information, unloading the second executable code from the second processor, and sending, to the first processor, first executable code corresponding to the code segment corresponding to the second executable code.

A third aspect of the embodiments of the present disclosure further provides a compiler, including an obtaining unit configured to obtain compilation policy information and source code, where the compilation policy information indicates that a first code type matches a first processor and a second code type matches a second processor, a determining unit configured to analyze a code segment in the source code according to the compilation policy information, and determine a first code segment belonging to the first code type or a second code segment belonging to the second code type, a compilation unit configured to compile the first code segment into first executable code, and compile the second code segment into second executable code, and a sending unit configured to send the first executable code to the first processor, and send the second executable code to the second processor.

With reference to an implementation of the third aspect, in a first optional implementation, the sending unit is configured to send the second executable code to the second processor using a scheduling manager, or the compilation unit is further configured to add, to the second executable code, instruction information for calling the second processor, and the sending unit is further configured to send the second executable code to a scheduling manager, and send the second executable code to the first processor using the scheduling manager such that the first processor sends the second executable code to the second processor after obtaining the instruction information.

With reference to the implementation of the third aspect, in a second optional implementation, the first processor is a CPU, the second processor is an FPGA, and determining unit is configured to collect statistics about a quantity of loop execution times of the code segment in the source code and/or execution duration of the CPU; and if a parameter obtained by means of statistics collection exceeds a first preset threshold, determine that the code segment belongs to the second code segment, or if the parameter obtained by means of statistics collection does not exceed the first preset threshold, determine that the code segment belongs to the first code segment; or the determining unit is configured to: compare the code segment in the source code with a feature rule of the second code segment; and if the code segment in the source code matches the feature rule of the second code segment, determine that the code segment is the second code segment, or if the code segment in the source code does not match the feature rule of the second code segment, determine that the code segment is the first code segment; or the determining unit is configured to read acceleration identifier information in the source code, and determine, according to an indication of the acceleration identifier information, that code in the source code belongs to the first code segment or the second code segment.

With reference to the second optional implementation of the third aspect, in a third optional implementation, the determining unit is configured to call a statistics instruction set to determine the quantity of loop execution times of the code segment in the source code and/or the execution duration of the CPU using function code in the source code, or the determining unit is configured to obtain a periodically-collected code execution statistics report to determine the quantity of loop execution times of the code segment in the source code and/or the execution duration of the CPU.

With reference to the third aspect, or the first, the second, or the third optional implementation of the third aspect, in a fourth optional implementation, if a priority of a process corresponding to the second code segment is higher than a priority of a process corresponding to executable code being executed in the second processor, the device further includes a first processing unit, configured to: if a busy degree of the second processor is higher than a second preset threshold, stop the executable code being executed in the second processor, and a second processing unit configured to compile a code segment corresponding to the executable code being executed in the second processor into executable code matching the first processor, and send the executable code matching the first processor to the first processor.

With reference to the third aspect, or the first, the second, or the third optional implementation of the third aspect, in a fifth optional implementation, if the first code segment belongs to a main code segment, and the second code segment is subordinate to the main code segment, the compiler further includes a third processing unit configured to add an interaction instruction to the first executable code and the second executable code such that the second processor returns an execution result of the second executable code to the first processor.

A fourth aspect of the embodiments of the present disclosure provides a compiler, including an obtaining unit configured to obtain compilation policy information and source code, where the compilation policy information indicates that a first code type matches a first processor and a second code type matches a second processor, a first compilation unit configured to compile, according to the compilation policy information, a code segment in the source code into first executable code matching the first processor, a first sending unit configured to send the first executable code to the first processor, a first receiving unit configured to receive first execution information that is obtained by means of statistics collection by the first processor and that is of the first executable code, a first processing unit configured to determine, according to the first execution information, whether a code segment corresponding to the first executable code matches the second processor, a second compilation unit configured to compile the code segment corresponding to the first executable code into second executable code if the first processing unit determines, according to the first execution information, that the code segment corresponding to the first executable code matches the second processor, and a second sending unit configured to send the second executable code to the second processor.

With reference to an implementation of the fourth aspect, in a first optional implementation, the compiler further includes a second receiving unit configured to receive, from the second processor, second execution information of executing the second executable code, and if a matching degree between the second processor and a code segment corresponding to the second executable code is lower than an expected value according to the second execution information, a second processing unit configured to unload the second executable code from the second processor, and send, to the first processor, first executable code corresponding to the code segment corresponding to the second executable code.

A fifth aspect of the embodiments of the present disclosure provides a device, including a compiler and a scheduling manager, where the compiler includes an obtaining unit, a determining unit, a compilation unit, and a sending unit, where the obtaining unit is configured to obtain compilation policy information and source code, where the compilation policy information indicates that a first code type matches a first processor and a second code type matches a second processor, the determining unit is configured to analyze a code segment in the source code according to the compilation policy information, and determine a first code segment belonging to the first code type or a second code segment belonging to the second code type, the compilation unit is configured to compile the first code segment into first executable code, and compile the second code segment into second executable code, and the sending unit is configured to send the first executable code and the second executable code to the scheduling manager, and the scheduling manager is configured to send the first executable code to the first processor, and send the second executable code to the second processor.

With reference to an implementation of the fifth aspect, in a first optional implementation, the scheduling manager is further configured to configure the compilation policy information, and send the compilation policy information to the compiler.

With reference to the implementation of the fifth aspect, in a second optional implementation, if the first processor is a CPU, and the second processor is an FPGA, the determining unit is further configured to call a statistics instruction set, to determine a quantity of loop execution times of the code segment in the source code and/or execution duration of the CPU using function code in the source code, or the scheduling manager is further configured to obtain a periodically-collected code execution statistics report, to send the periodically-collected code execution statistics report to the compiler, and the determining unit is further configured to determine a quantity of loop execution times of the code segment in the source code and/or execution duration of the CPU according to the code execution statistics report, and that the determining unit is configured to determine a first code segment belonging to the first code type or a second code segment belonging to the second code type includes if the quantity of loop execution times or the execution duration of the CPU or both exceed a first preset threshold, determining that the code segment belongs to the second code segment, or if neither the quantity of loop execution times nor the execution duration of the CPU exceeds a first preset threshold, determining that the code segment belongs to the first code segment.

With reference to the implementation of the fifth aspect, in a third optional implementation, the scheduling manager is further configured to if a busy degree of the second processor is higher than a second preset threshold, after the compiler stops executable code being executed in the second processor, and compiles a code segment corresponding to the executable code being executed in the second processor into executable code matching the first processor, receive the executable code matching the first processor, and send the executable code matching the first processor to the first processor.

It can be learned from the foregoing technical solutions that, the embodiments of the present disclosure have the following advantages. A compiler compiles a code segment that matches a first processor and that is in source code into first executable code that can be executed by the first processor, and compiles a code segment that matches a second processor and that is in the source code into second executable code that can be executed by the second processor. The first executable code is sent to the first processor, and the second executable code is sent to the second processor. Therefore, executable code corresponding to a code segment in the source code is allocated to hardware with a higher matching degree for execution such that execution efficiency is higher, and hardware acceleration is implemented.

BRIEF DESCRIPTION OF DRAWINGS

To describe the technical solutions in some of the embodiments of the present disclosure more clearly, the following briefly describes the accompanying drawings describing some of the embodiments.

DESCRIPTION OF EMBODIMENTS

To make the objectives, technical solutions, and advantages of the present disclosure clearer, the following further describes the present disclosure in detail with reference to the accompanying drawings.

Embodiments of the present disclosure provide a hardware acceleration method, a compiler, and a device, to improve code execution efficiency and implement hardware acceleration.

For ease of understanding the embodiments of the present disclosure, the following describes a system architecture in the embodiments of the present disclosure.

Figure 1:
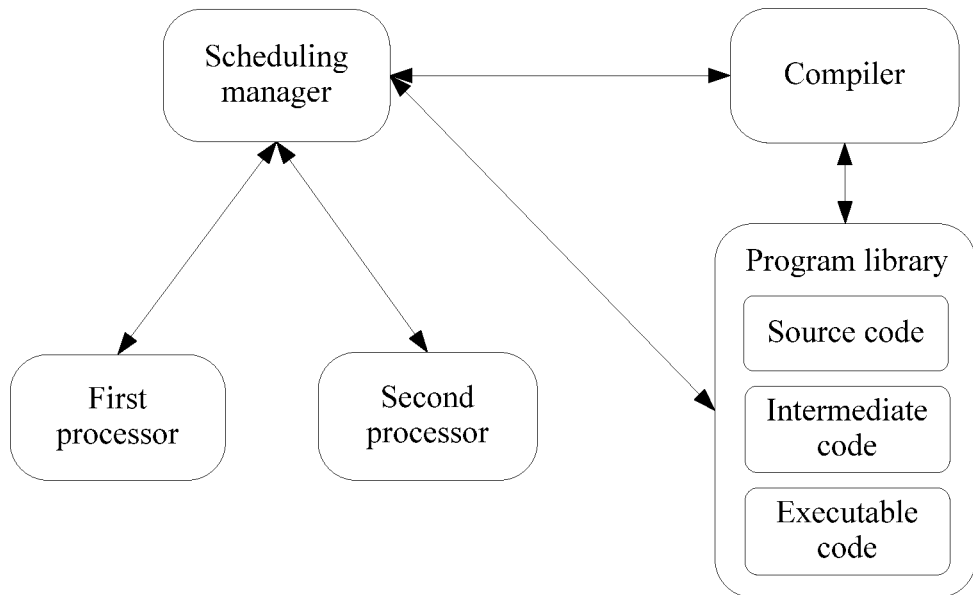
FIG. 1 is a schematic diagram of a system architecture according to an embodiment of the present disclosure.

Referring to FIG. 1, the system architecture includes a compiler, a scheduling manager, a first processor, a second processor, and a program library.

The scheduling manager is responsible for managing and scheduling one or more first processors and second processors, loads an executable file onto the first processor and the second processor and unload an executable file from the first processor and the second processor, and is responsible for providing a compilation policy and hardware information for the compiler.

The compiler is configured to compile source code and generate intermediate code and executable code.

The first processor is a chip such as a CPU, a graphics processing unit (GPU), or a network processor (NP).

The second processor is a programmable logic device such as an FPGA, a complex programmable logical device (CPLD), programmable array logic (PAL), or generic array logic (GAL).

The program library includes the source code, the intermediate code, and the executable code.

Based on the system architecture, a hardware acceleration method provided in the present disclosure is described using the following embodiments.

Figure 2:
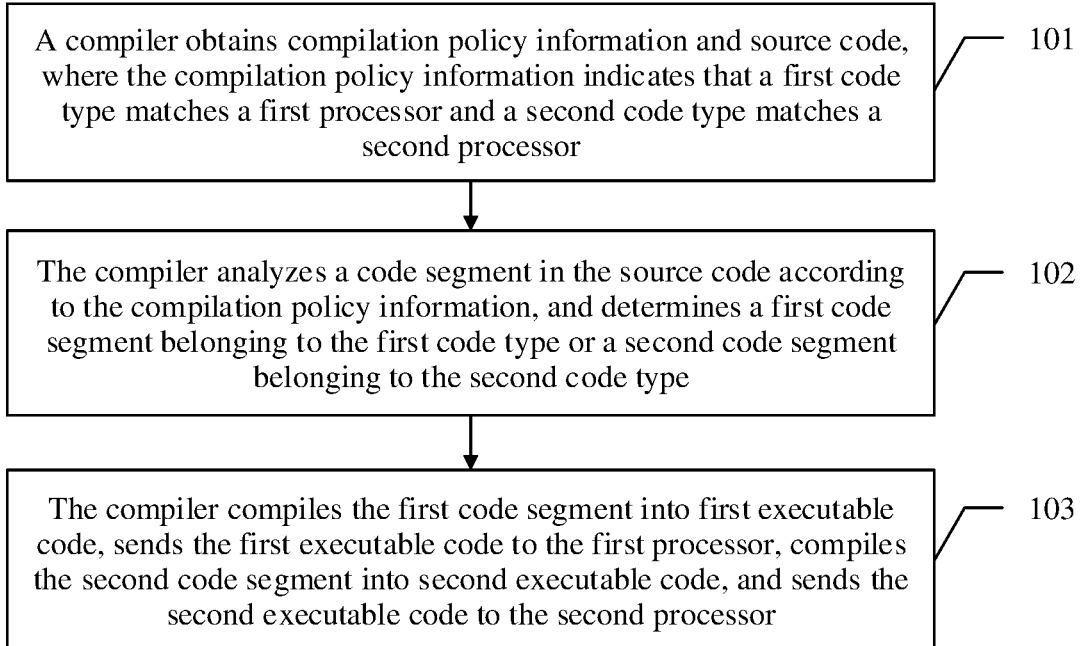
FIG. 2 is a schematic flowchart of a method according to an embodiment of the present disclosure.

Referring to FIG. 2, a hardware acceleration method in an embodiment of the present disclosure includes the following steps.

Step 101. A compiler obtains compilation policy information and source code, where the compilation policy information indicates that a first code type matches a first processor and a second code type matches a second processor.

In this embodiment, the compiler may obtain the compilation policy information using multiple methods. For example, the compiler obtains pre-configured compilation policy information from a local memory, or receives compilation policy information delivered by a scheduling manager.

In this embodiment, the local memory may store the compilation policy information, or may store indication information of the compilation policy information, for example, information indicating how to obtain the compilation policy information, or address information of the compilation policy information.

The compilation policy information includes a detected compilation policy that can be used during FPGA acceleration, an FPGA acceleration effect threshold, a maximum compilation duration threshold (which is maximum compilation duration specified because a relatively long time is sometimes required during compilation for an FPGA), and a compilation exception policy (which is an exception policy specified for processing a series of exceptions that may be generated during a compilation process for an FPGA and a compilation process for a CPU).

The CPU is configured to represent the first processor, and the FPGA is configured to represent the second processor.

A code type includes acceleration-available code and common code. The acceleration-available code may be a CPU instruction, a code block, a function (module), and a source file.

The first processor and the second processor are any two of a CPU, an FPGA, a GPU, an NP, an application-specific integrated circuit (ASIC), a CPLD, a PAL, or a GAL. It can be understood that the CPU, the GPU, and the NP are chips having a software programming capability, and the FPGA, the ASIC, the PAL, the GAL, and the CPLD are programmable logic devices.

The source code may include one or more files. A programming language used in the source code may be an assembly language, a C language, or a script programming language, or may include another type of language. Details are not described herein.

Step 102. The compiler analyzes a code segment in the source code according to the compilation policy information, and determines a first code segment belonging to the first code type or a second code segment belonging to the second code type.

After obtaining the compilation policy information and the source code, the compiler analyzes the code segment in the source code, and determines the first code segment belonging to the first code type or the second code segment belonging to the second code type.

The compiler detects, according to the compilation policy information, whether there is acceleration-available code in the source code, and generates intermediate source code from common code in the source code according to a detection result. The intermediate source code may be understood as source code that exists in another form of the common code in the source code.

When the first processor is a CPU, and the second processor is an FPGA, optionally, the compiler collects statistics about a quantity of loop execution times of the code segment in the source code and/or execution duration of the CPU; and if a parameter obtained by means of statistics collection exceeds a first preset threshold, determines that the code segment belongs to the second code segment, or if the parameter obtained by means of statistics collection does not exceed the first preset threshold, determines that the code segment belongs to the first code segment. Alternatively, the compiler compares the code segment in the source code with a feature rule of the second code segment; and if the code segment in the source code matches the feature rule of the second code segment, determines that the code segment is the second code segment, or if the code segment in the source code does not match the feature rule of the second code segment, determines that the code segment is the first code segment. Alternatively, the compiler reads acceleration identifier information in the source code, and determines, according to an indication of the acceleration identifier information, that code in the source code belongs to the first code segment or the second code segment. That the compiler collects statistics about a quantity of loop execution times of the code segment in the source code and/or execution duration of the CPU is as follows. The compiler calls a statistics instruction set to determine the quantity of loop execution times of the code segment in the source code and/or the execution duration of the CPU using function code in the source code, or the compiler obtains a periodically-collected code execution statistics report to determine the quantity of loop execution times of the code segment in the source code and/or the execution duration of the CPU. The statistics instruction set may be extended by the CPU. Statistics about executable code may be collected using the statistics instruction set. The compiler automatically calls the statistics instruction set during compilation. The periodically-collected code execution statistics report may be implemented using an external program, or may be implemented by performing manual intervention on code.

It should be noted that the first preset threshold corresponds to the parameter obtained by means of statistics collection. If there are many parameters obtained by means of statistics collection, the first preset threshold may be a group of parameter values. For example, if the quantity of loop execution times is obtained by means of statistics collection, the first preset threshold may be a parameter such as 100 times or 50 times. Consequently, if the quantity of loop execution times exceeds a quantity of times specified in the first preset threshold, it indicates that the code segment needs to be compiled into FPGA-executable code. If the quantity of loop execution times and the execution duration of the CPU are obtained by means of statistics collection, the first preset threshold may be a group of parameter values such as 100 times and 2 seconds (s). Consequently, the threshold is exceeded if the quantity of loop execution times exceeds 100 times, or the execution duration of the CPU exceeds 2 s. In this case, it may be considered that the first preset threshold is exceeded when any parameter is exceeded, or it may be considered that the first preset threshold is exceeded only when both of the two parameters are exceeded. Based on different parameters obtained by means of statistics collection, the first preset threshold may have another parameter type. A specific parameter value of the first preset threshold may be determined according to experience or an acceleration requirement. The foregoing example shall not be construed as a uniqueness-limitation on this embodiment of the present disclosure.

In addition, the feature rule means that the compiler presets an acceleration-available code feature description library, and the acceleration-available code feature description library includes the feature rule.

Further, the acceleration identifier information means that a programmer selects target code from the source code, and adds an identifier to the target code, to indicate that the target code can be accelerated.

Step 103. The compiler compiles the first code segment into first executable code, sends the first executable code to the first processor, compiles the second code segment into second executable code, and sends the second executable code to the second processor.

The compiler compiles the first code segment into first processor-executable code, that is, the first executable code, and sends the first executable code to the first processor, and compiles the second code segment into second processor-executable code, that is, the second executable code, and sends the second executable code to the second processor. In this embodiment of the present disclosure, a manner of sending executable code to a processor by the compiler should not be understood as a data packet sending manner in a narrow sense, but should be understood as a data transfer manner in a broad sense. The data transfer manner is not only the data packet sending manner, and there are many data transfer manners that may be usually used between the compiler and the processor. For example, the executable code is stored in storage space such as a disk, and then the CPU reads the executable code. Alternatively, the executable code is stored in a disk, and then is downloaded to an FPGA chip. A specific data transfer manner may be selected according to a hardware requirement, and is not limited in this embodiment of the present disclosure In addition, if an execution amount of the first or the second executable code is excessively large, and there are multiple pieces of first hardware or second hardware, load balancing processing may be performed between a same type of hardware. For a load balancing manner, refer to various existing load balancing algorithms, and details are not described in this embodiment of the present disclosure.

It can be understood that, after the first processor and the second processor respectively receive the first executable code and the second executable code, the first processor and the second processor complete code interaction using an interaction instruction.

Optionally, before the second executable code is sent to the second processor, if a priority of a process corresponding to the second code segment is higher than a priority of a process corresponding to executable code being executed in the second processor, the method further includes: if a busy degree of the second processor is higher than a second preset threshold, stopping the executable code being executed in the second processor, compiling a code segment corresponding to the executable code being executed in the second processor into executable code matching the first processor, and sending the executable code matching the first processor to the first processor.

It should be noted that the busy degree is a degree of data processing resource occupation of the second processor. More occupation indicates a higher busy degree. If congestion and queuing occur, longer queuing waiting duration indicates a higher busy degree. The second preset threshold is a critical value of the busy degree. For example, if resource usage exceeds a threshold, or queuing duration exceeds a threshold, in this case, it may be determined that the second processor is in a busy state. In addition, the foregoing priorities are different priorities allocated to different execution logic (tasks, processes, threads, or the like).

Optionally, if the first code segment belongs to a main code segment, and the second code segment is subordinate to the main code segment, the method further includes adding an interaction instruction to the first executable code and the second executable code such that the second processor returns an execution result of the second executable code to the first processor.

The main code segment may be understood as a common code segment, and a subordinate code segment may be understood as an acceleration-available code segment.

In addition, the compiler may send the second executable code to the second processor using multiple methods. For example, the compiler sends the second executable code to the second processor using a scheduling manager. Alternatively, the compiler adds, to the second executable code, instruction information for calling the second processor, and sends the second executable code to the first processor using a scheduling manager such that the first processor sends the second executable code to the second processor after obtaining the instruction information.

In this embodiment, a compiler compiles a code segment that matches a first processor and that is in source code into first executable code that can be executed by the first processor, and compiles a code segment that matches a second processor and that is in the source code into second executable code that can be executed by the second processor. The first executable code is sent to the first processor, and the second executable code is sent to the second processor. Therefore, executable code corresponding to a code segment in the source code is allocated to hardware with a higher matching degree for execution such that execution efficiency is higher, and hardware acceleration is implemented.

Figure 3:
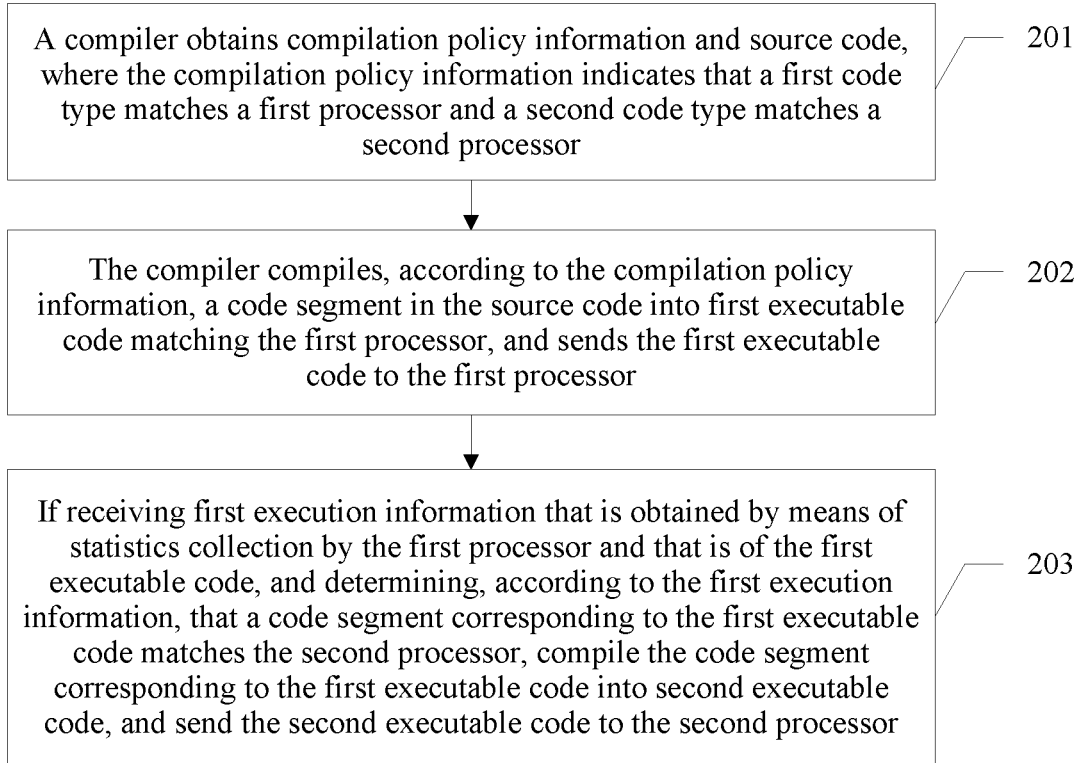
FIG. 3 is a schematic flowchart of a method according to an embodiment of the present disclosure.

Referring to FIG. 3, a hardware acceleration method in an embodiment of the present disclosure includes the following steps.

Step 201. A compiler obtains compilation policy information and source code, where the compilation policy information indicates that a first code type matches a first processor and a second code type matches a second processor.

In this embodiment, step 201 is similar to step 101, and details are not described herein again.

Step 202. The compiler compiles, according to the compilation policy information, a code segment in the source code into first executable code matching the first processor, and sends the first executable code to the first processor.

The compiler compiles, using a compilation unit in the compiler, the code segment in the source code into the first executable code matching the first processor, and sends the first executable code to the first processor.

It can be understood that the compiler may generate intermediate source code according to the compilation policy information, and then compile a code segment in the intermediate source code.

Step 203. If receiving first execution information that is obtained by means of statistics collection by the first processor and that is of the first executable code, and determining, according to the first execution information, that a code segment corresponding to the first executable code matches the second processor, compile the code segment corresponding to the first executable code into second executable code, and send the second executable code to the second processor.

After receiving the first executable code, the first processor generates the first execution information, and sends the first execution information to the compiler. If the compiler determines, according to the first execution information, that the code segment corresponding to the first executable code matches the second processor, the compiler modifies the compilation policy information using a scheduling manager, compiles the code segment corresponding to the first executable code into the second executable code, and sends the second executable code to the second processor using the scheduling manager.

The first execution information is a parameter used to determine whether the executable code matches the processor. Based on the foregoing example, the execution information herein may be execution duration or a quantity of execution times of the first executable code in the first processor, or may be other information. Examples are not illustrated herein one by one.

Optionally, after step 203, the method may further include receiving, from the second processor, second execution information of executing the second executable code; and if determining, according to the second execution information, that a matching degree between the second processor and a code segment corresponding to the second executable code is lower than an expected value, unloading the second executable code from the second processor, and sending, to the first processor, first executable code corresponding to the code segment corresponding to the second executable code.

It should be noted that the first executable code corresponding to the code segment corresponding to the second executable code means that the code segment corresponding to the second executable code is recompiled to generate the first executable code, and the first executable code is sent to the first processor.

In this embodiment, the second execution information is also a parameter used to determine whether the executable code matches the processor, and may be illustrated with reference to a parameter selected for the first execution information.

In this embodiment, a code segment in source code is compiled into first executable code matching a first processor. When a code segment corresponding to the first executable code matches a second processor, the code segment corresponding to the first executable code is compiled into second executable code, and the second executable code is received by the second processor. Therefore, executable code corresponding to a code segment in the source code is allocated to hardware with a higher matching degree for execution such that execution efficiency is higher, and hardware acceleration is implemented.

In addition, when efficiency of executing the second executable code in the second processor is not high, the second executable code is unloaded from the second processor, and a code segment corresponding to the second executable code is recompiled and then is executed by the first processor.

Figure 4:
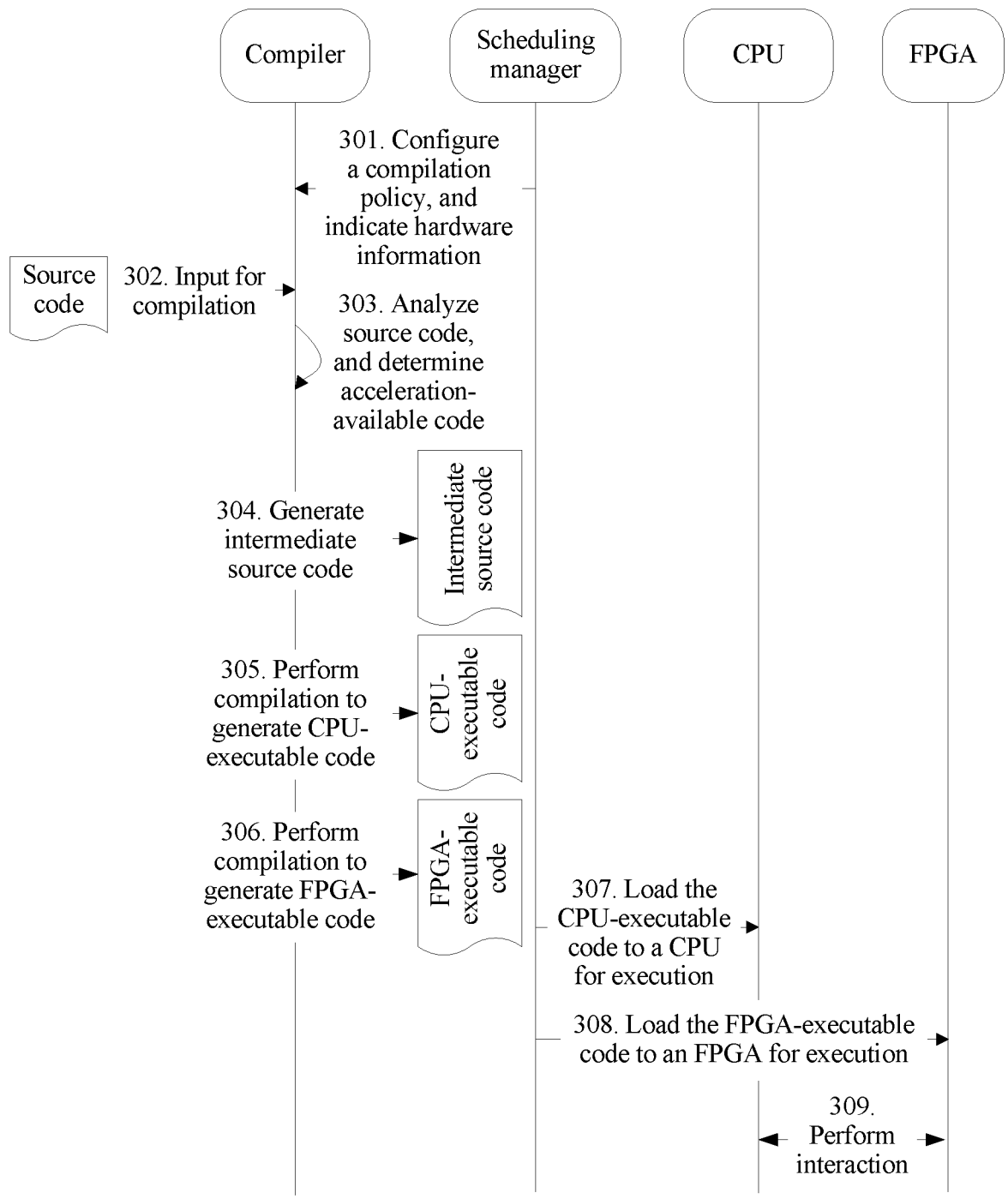
FIG. 4 is a schematic flowchart of a method according to an embodiment of the present disclosure.

For ease of understanding, the following describes a hardware acceleration method in an embodiment of the present disclosure in detail. Referring to FIG. 4, the hardware acceleration method in this embodiment of the present disclosure includes the following steps.

Step 301. A compiler receives compilation policy information and hardware information that are delivered by a scheduling manager.

In this embodiment, the scheduling manager configures the compilation policy information and the hardware information, and the scheduling manager sends the compilation policy information and the hardware information to the compiler.

The compilation policy information in this embodiment is that acceleration-available code is directly compiled into FPGA-executable code, and is loaded to an FPGA for running.

The hardware information includes a CPU model and quantity, a type and a version number of an operating system on a CPU, information about a memory available for a CPU, an FPGA model and quantity, information about a peripheral chip connected to an FPGA, and a manner for interaction between a CPU and an FPGA.

Step 302. The compiler receives source code.

The source code may include one or more files. A programming language used in the source code may be an assembly language, a C language, a script programming language, or may include another type of language. Details are not described herein. The C language is used as an example. It is assumed that the source code in this embodiment is:

```
int func1(int a[8])
{
    int a[8], b;
    ...
    b = a[0]*a[1]*a[2]*a[3]*a[4]*a[5]*a[6]*a[7];
    return b;
}
```

Step 303. The compiler analyzes the source code, and determines acceleration-available code.

An acceleration-available code feature description library is preset in the compiler. The compiler compares the source code with a feature rule in the acceleration-available code feature description library. If a code segment in the source code is matched, it indicates that the code segment can be accelerated using an FPGA.

It should be noted that another method may also be used. For example, a programmer may set, in the source code, code that needs to be accelerated, for example:

```
#program fpga_acc_func
int func1(int a[8])
{
    int a[8], b;
    b = a[0]*a[1]*a[2]*a[3]*a[4]*a[5]*a[6]*a[7];
    return b;
}
``` program fpga_acc_func is used to indicate that the function needs to be accelerated. For another example:

```
int func1(int a[8])
{
    int a[8], b;
    #program fpga_acc_begin
    b = a[0]*a[1]*a[2]*a[3]*a[4]*a[5]*a[6]*a[7];
    #program fpga_acc_end
    return b;
}
``` program fpga_acc_begin and #program fpga_acc_end are used to indicate that code between this pair needs to be accelerated.

Step 304. The compiler converts common code in the source code into intermediate source code.

The compiler detects, according to the acceleration-available code feature description library, a compilation policy information, and the hardware information, whether there is acceleration-available code in the source code, and then converts the common code in the source code into the intermediate source code according to a detection result. The intermediate source code may be:

```
int func1(int a[8])
{
    int a[8], b;
    ...
    b = fpga_multiply(a);
    return b;
}
```

Step 305. The compiler compiles the intermediate source code into CPU-executable code, and sends the CPU-executable code to the scheduling manager.

The compiler compiles the intermediate source code into the CPU-executable code using a CPU compilation unit, and the CPU compilation unit is located in the compiler.

Step 306. The compiler compiles the acceleration-available code into FPGA-executable code, and sends the FPGA-executable code to the scheduling manager.

The compiler compiles the acceleration-available code into the FPGA-executable code using an FPGA compilation unit, and sends the FPGA-executable code to the scheduling manager, and the FPGA compilation unit is located in the compiler.

It should be noted that efficiency of executing the acceleration-available code in the FPGA is higher than efficiency of executing the acceleration-available code in the CPU.

In addition, the acceleration-available code may be converted into logic language code, and then the converted logic language code is compiled into the FPGA-executable code.

Step 307. The scheduling manager loads the CPU-executable code to a CPU for execution.

The scheduling manager receives the CPU-executable code from the compiler, and the scheduling manager loads the CPU-executable code to the CPU for execution.

Step 308. The scheduling manager loads the FPGA-executable code to an FPGA for execution.

The scheduling manager receives the FPGA-executable code from the compiler, and the scheduling manager loads the FPGA-executable code to the FPGA for execution.

It should be noted that step 307 may be performed after step 308, and a sequence between step 307 and step 308 may be changed.

Step 309. The CPU and the FPGA perform code interaction.

Interaction between the CPU-executable code and the FPGA-executable code may be implemented using a pre-configured interoperability protocol. Further, interoperability primitives may be defined as follows.

Handshake: handshaking.

Negotiate: a negotiation capability, including respectively supported capabilities and specifications, a version and a feature of a used interoperability protocol, and the like.

WriteData: writing data to a counterpart directly.

ReadData: reading data from a counterpart directly.

WriteDataAddress: writing data to a counterpart according to an address. For example, in a DMA mode, according to a memory address and length that are indicated by a counterpart, content is written to the address.

ReadDataAddress: reading data from a counterpart according to an address. For example, in a DMA mode, according to a memory address and length that are indicated by a counterpart, content is read from the address.

Call: calling a function of a counterpart.

Callback: calling a function of a counterpart, to obtain a returned value after the function is executed, or to implement function callback.

In this embodiment, a compiler compiles a code segment that matches an FPGA and that is in source code into FPGA-executable code, and compiles a code segment that matches a CPU and that is in the source code into CPU-executable code. The FPGA-executable code is sent to the FPGA, and the CPU-executable code is sent to the CPU. Therefore, executable code corresponding to a code segment in the source code is allocated to hardware with a higher matching degree for execution such that execution efficiency is higher, and hardware acceleration is implemented.

Figure 5:
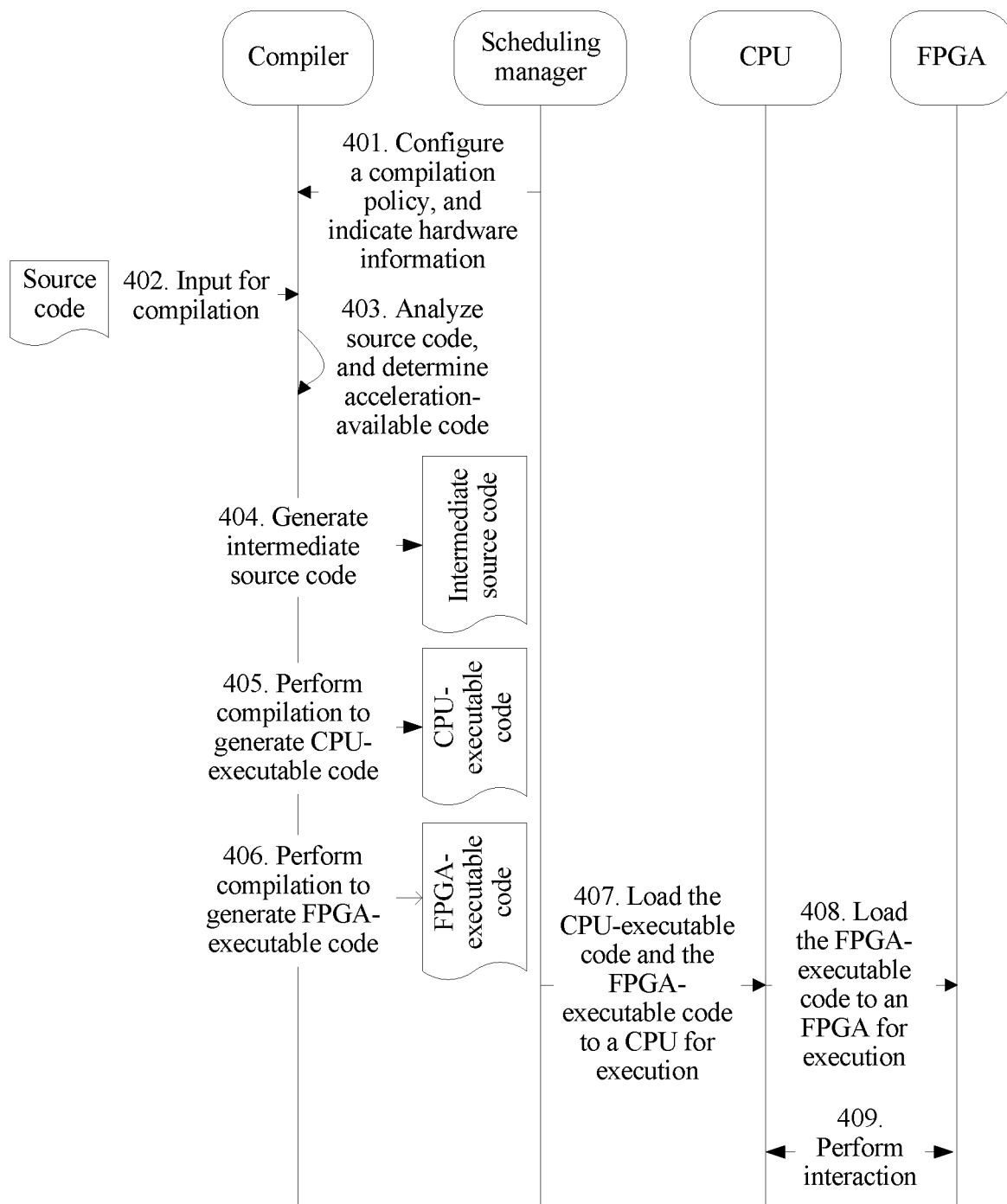
FIG. 5 is a schematic flowchart of a method according to an embodiment of the present disclosure.

For ease of understanding, the following describes a hardware acceleration method in an embodiment of the present disclosure in detail. Referring to FIG. 5, the hardware acceleration method in this embodiment of the present disclosure includes the following steps.

Step 401. A compiler receives compilation policy information and hardware information that are delivered by a scheduling manager.

In this embodiment, the compilation policy information is that statistics about a quantity of times of executing, in a CPU, acceleration-available code in source code are collected, and after the quantity of execution times reaches a first preset threshold (the first preset threshold is assumed to be 100 in this embodiment), the acceleration-available code is compiled into FPGA-executable code, and is loaded to an FPGA for running.

Step 402. The compiler receives source code.

The source code in this embodiment is assumed to be:

```
void func2(bool c, FILE* file1, FILE* file2)
{
  if (c)
  {
    zip_func(file1);
    unzip_func(file2);
  }
}
```

Step 403. The compiler analyzes the source code, and determines acceleration-available code.

Step 403 is similar to step 303, and details are not described herein again.

Step 404. The compiler converts common code in the source code into intermediate source code.

The intermediate source code may be:

```
void func2(bool c, FILE* file1, FILE* file2)
{
  if (c)
  {
    static int cnt=0;
    if (cnt++ < 100)
    {
      zip_func(file1);
      unzip_func(file2);
    }
    else
    {
      fpga_zip_func(file1);
      fpga_unzip_func(file2);
    }
  }
}
```

Step 405. The compiler compiles the intermediate source code into CPU-executable code, and sends the CPU-executable code to the scheduling manager.

Step 406. The compiler compiles the acceleration-available code into FPGA-executable code, and sends the FPGA-executable code to the scheduling manager. The FPGA-executable code carries instruction information for calling an FPGA.

Step 405 and step 406 are similar to step 305 and step 306, and details are not described herein again.

In addition, step 405 may be performed after step 406, and a sequence between step 405 and step 406 may be changed.

In addition, the compiler adds, to the FPGA-executable code, the instruction information for calling the FPGA. The instruction information instructs to send the FPGA-executable code to the FPGA when a quantity of times of executing the FPGA-executable code in the CPU is greater than 100 times (this indicates that execution efficiency is excessively low).

Step 407. The scheduling manager loads the CPU-executable code to a CPU for execution, and loads the FPGA-executable code to the CPU for execution.

Step 408. The CPU sends the FPGA-executable code to the FPGA according to the instruction information.

After determining that the quantity of times of executing the FPGA-executable code in the CPU is greater than 100 times, the CPU sends the FPGA-executable code to the FPGA according to the instruction information.

Step 409. The CPU and the FPGA perform code interaction.

In this embodiment, FPGA-executable code and CPU-executable code are first sent to a CPU, and the CPU sends the FPGA-executable code to an FPGA according to instruction information carried in the FPGA-executable code and a fact that a quantity of times of executing the FPGA-executable code in the CPU is greater than a first preset threshold. Efficiency of executing the FPGA-executable code in the FPGA is higher, and therefore, execution efficiency is higher, and hardware acceleration is implemented.

Figure 6A:
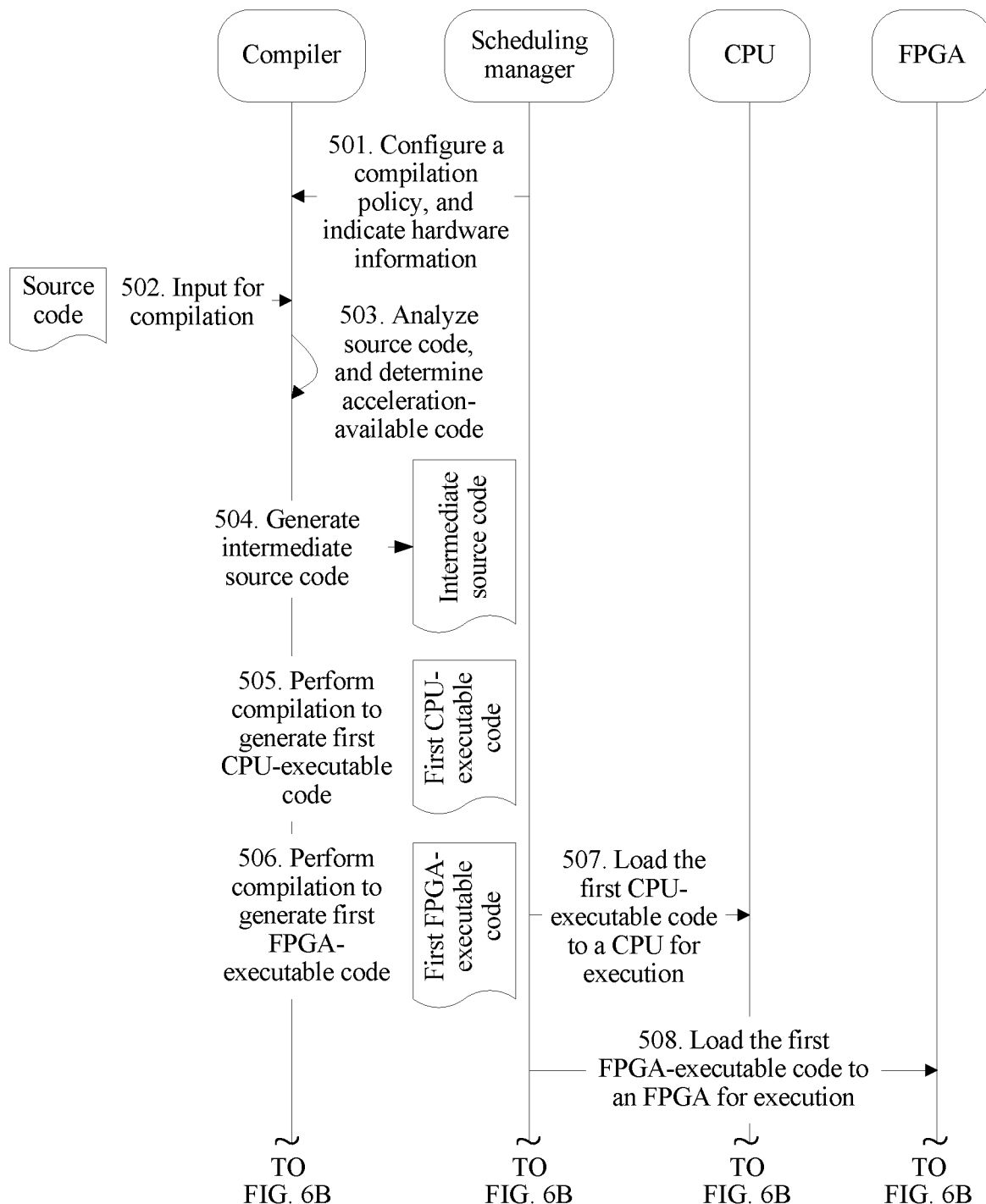
FIG. 6A and FIG. 6B are a schematic flowchart of a method according to an embodiment of the present disclosure.
Figure 6B:
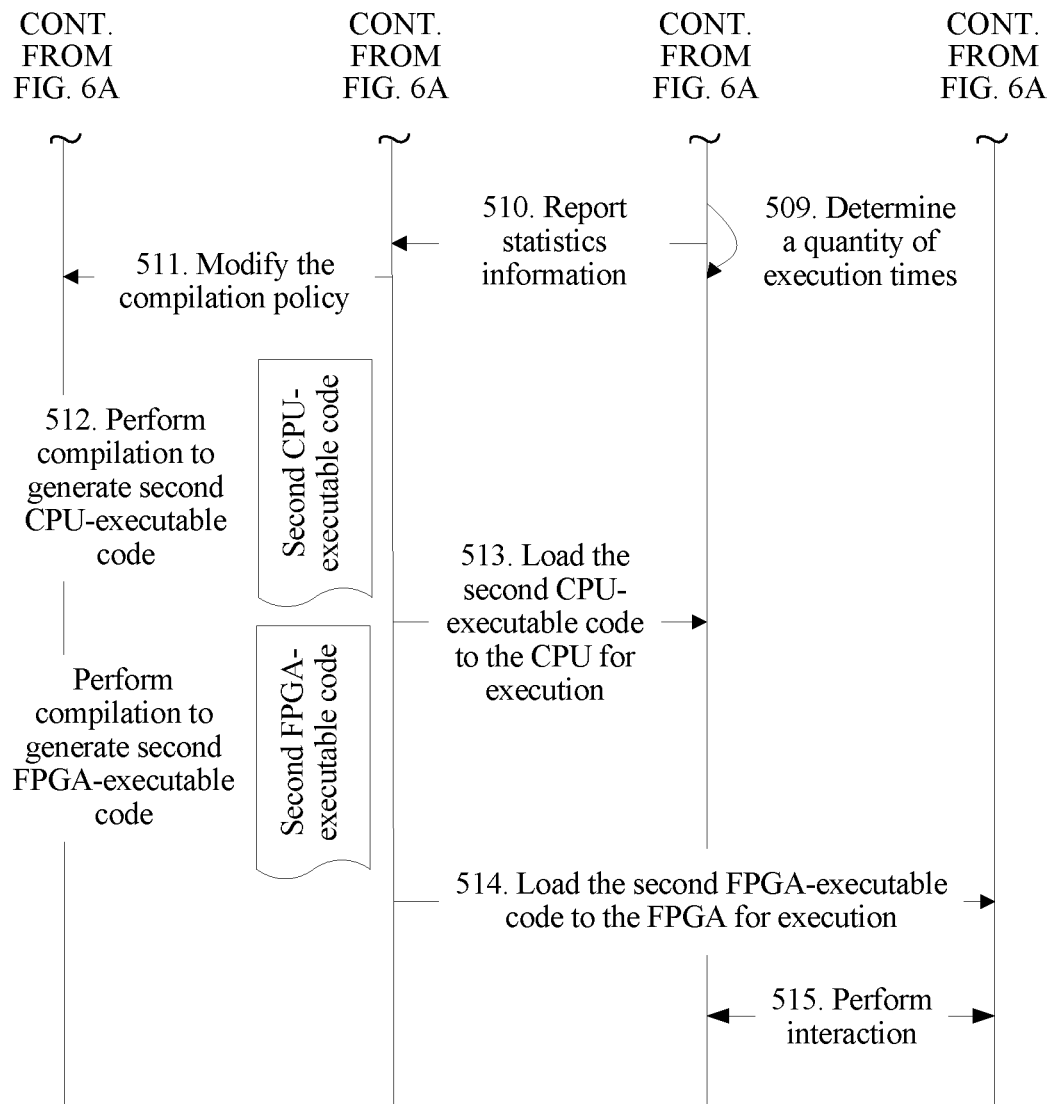

For ease of understanding, the following describes a hardware acceleration method in an embodiment of the present disclosure in detail. Referring to FIG. 6A and FIG. 6B, the hardware acceleration method in this embodiment of the present disclosure includes the following steps.

Step 501. A compiler receives compilation policy information and hardware information that are delivered by a scheduling manager.

Step 502. The compiler receives source code.

Step 503. The compiler analyzes the source code, and determines acceleration-available code.

Step 504. The compiler converts common code in the source code into intermediate source code.

Step 505. The compiler compiles the intermediate source code into first CPU-executable code, and sends the first CPU-executable code to the scheduling manager.

Step 506. The compiler compiles the acceleration-available code into first FPGA-executable code, and sends the first FPGA-executable code to the scheduling manager.

Step 501 to step 506 are similar to step 401 to step 406, and details are not described herein again.

Step 507. The scheduling manager loads the first CPU-executable code to a CPU for execution.

Step 508. The scheduling manager loads the first FPGA-executable code to an FPGA for execution.

It should be noted that step 507 may be performed after step 508, and a sequence between step 507 and step 508 may be changed.

Step 509. The CPU determines a quantity of execution times of various code in the first CPU-executable code.

There may be code with relatively low execution efficiency in the first CPU-executable code, and a quantity of execution times of the code with low execution efficiency is large. Therefore, the acceleration-available code may be found using the quantity of execution times.

Step 510. The CPU reports statistics information about the quantity of execution times to the scheduling manager.

When there is code whose quantity of execution times is greater than 100 times in the first CPU-executable code, it indicates that the code can be accelerated, and the FPGA may execute the code. Therefore, the CPU reports the statistics information to the scheduling manager, and the statistics information is the quantity of execution times of the code. It should be noted that the FPGA may also report statistics information to the scheduling manager (in this case, there is code with low execution efficiency in the FPGA).

Step 511. The scheduling manager modifies the compilation policy information, and sends modified compilation policy information to the compiler.

After receiving the statistics information, the scheduling manager determines that the quantity of execution times is greater than 100 times, and the scheduling manager modifies the compilation policy information, and sends the modified compilation policy information to the compiler.

Step 512. The compiler performs recompilation according to the modified compilation policy information, generates second CPU-executable code and second FPGA-executable code, and sends the second CPU-executable code and the second FPGA-executable code to the scheduling manager.

It can be understood that the compiler recompiles the source code to generate intermediate source code. The intermediate source code herein is different from the source code in step 504.

Step 513. The scheduling manager loads the second CPU-executable code to the CPU for execution.

Step 514. The scheduling manager loads the second FPGA-executable code to the FPGA for execution.

Step 515. The CPU and the FPGA perform code interaction.

Step 513 to step 515 are similar to step 307 to step 309, and details are not described herein again.

In this embodiment, when there is code whose quantity of execution times is greater than a first preset threshold in CPU-executable code, it indicates that an execution speed is excessively slow. Therefore, compilation policy information is modified by a scheduling manager such that a compiler performs recompilation, and generates new CPU-executable code and new FPGA-executable code. Therefore, execution efficiency is higher, and hardware acceleration is implemented.

Figure 7A:
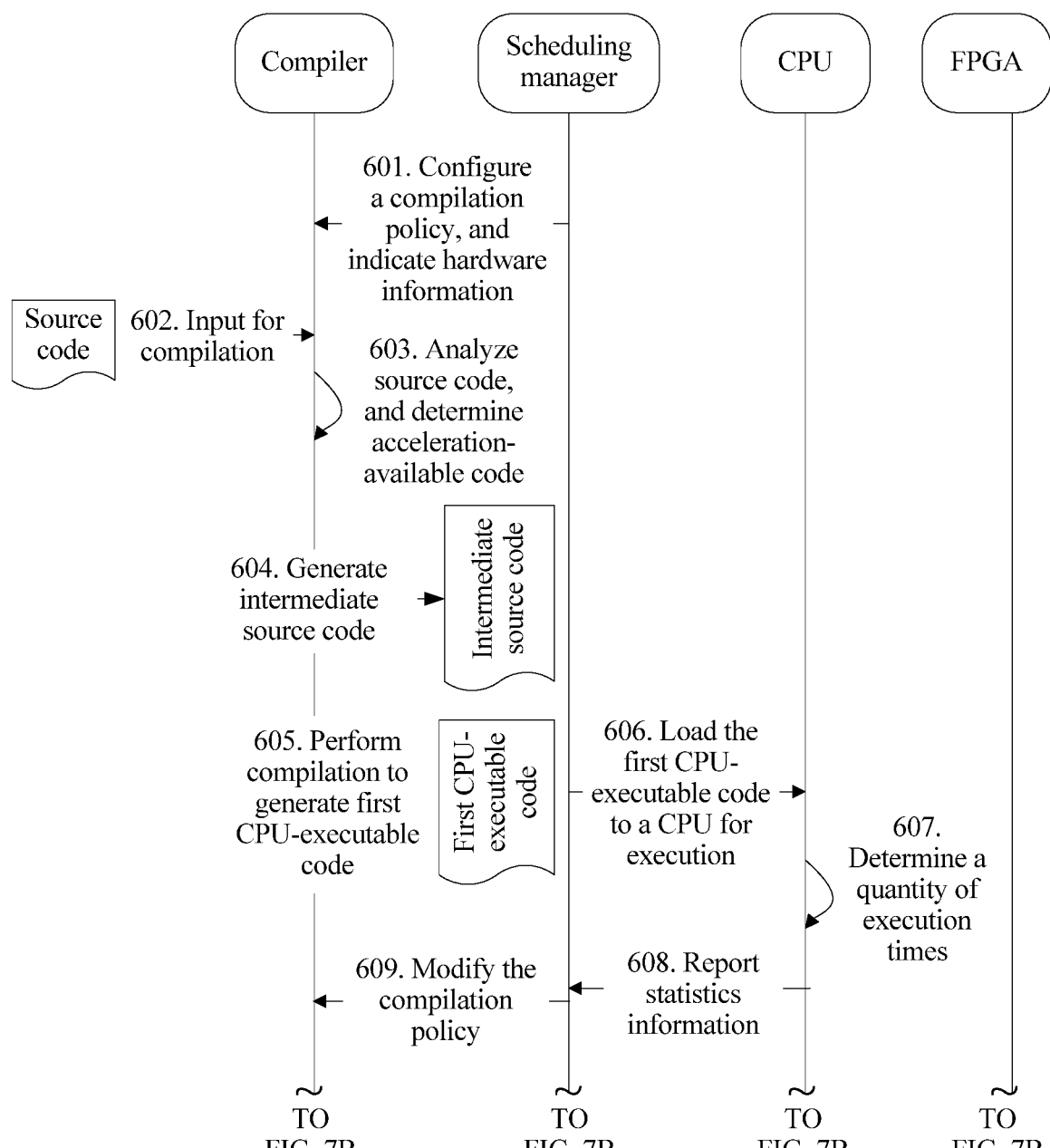
FIG. 7A and FIG. 7B are a schematic flowchart of a method according to an embodiment of the present disclosure.
Figure 7B:
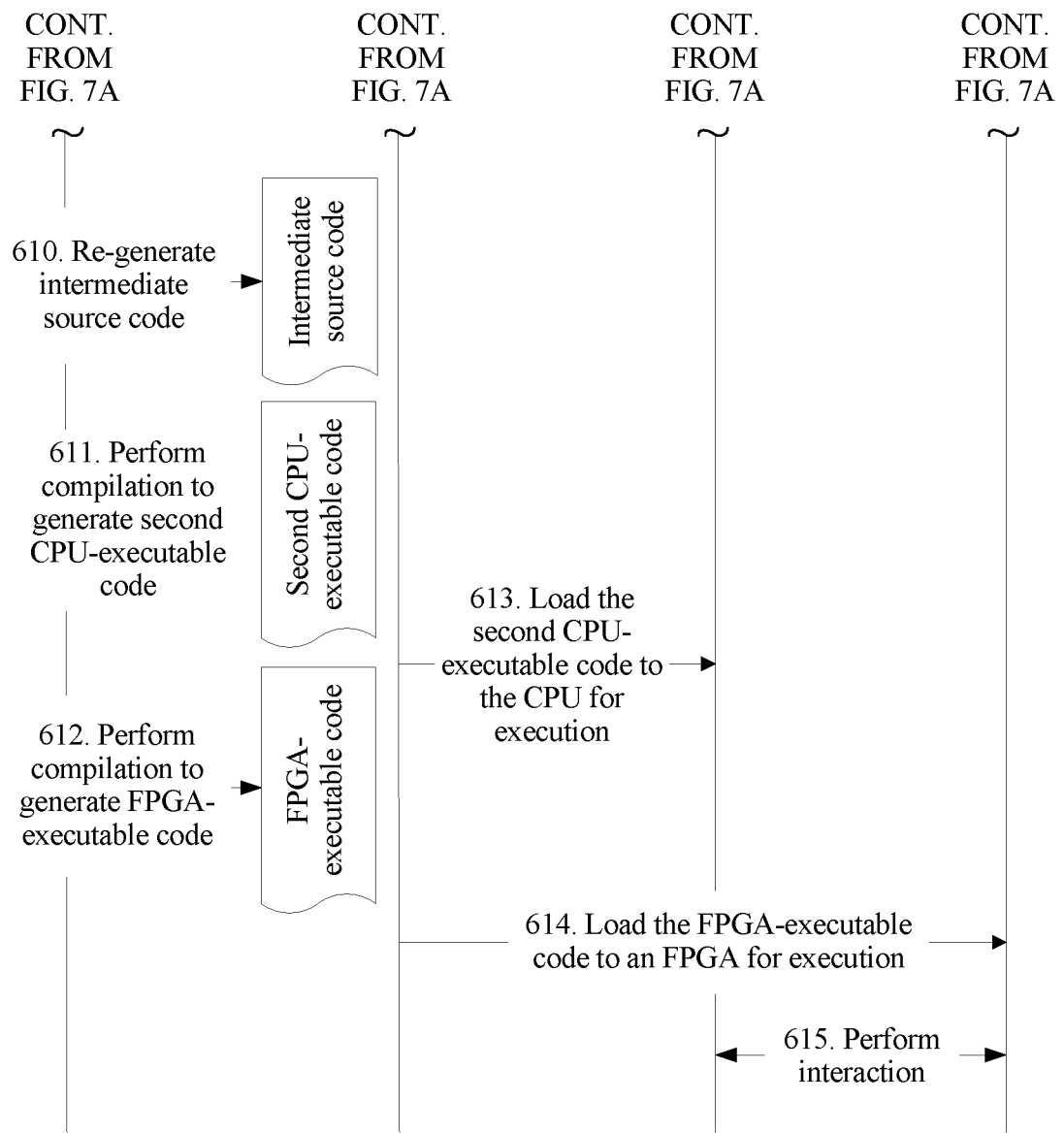

For ease of understanding, the following describes a hardware acceleration method in an embodiment of the present disclosure in detail. Referring to FIG. 7A and FIG. 7B, the hardware acceleration method in this embodiment of the present disclosure includes the following steps.

Step 601. A compiler receives compilation policy information and hardware information that are delivered by a scheduling manager.

Step 602. The compiler receives source code.

Step 603. The compiler analyzes the source code, and determines acceleration-available code.

Step 604. The compiler converts the source code into intermediate source code.

Step 605. The compiler compiles the intermediate source code into first CPU-executable code, and sends the first CPU-executable code to the scheduling manager.

Step 601 to step 605 are similar to step 401 to step 405, and details are not described herein again.

In addition, it can be understood that the acceleration-available code in the source code is also compiled into first CPU-executable code.

Step 606. The scheduling manager loads the first CPU-executable code to a CPU for execution.

Step 607. The CPU determines a quantity of execution times of the acceleration-available code in the CPU.

The acceleration-available code is also compiled into first CPU-executable code. Execution efficiency of the acceleration-available code in the CPU is not high, that is, the quantity of execution times is greater than a quantity of execution times of common code.

Step 608. The CPU reports statistics information about the quantity of execution times to the scheduling manager.

When the quantity of execution times is greater than 100, it indicates that the acceleration-available code may be executed by an FPGA, to improve execution efficiency. Therefore, the CPU reports the statistics information about the quantity of execution times to the scheduling manager.

Step 609. The scheduling manager modifies the compilation policy information, and sends modified compilation policy information to the compiler.

When the scheduling manager determines, using the statistics information, that the execution efficiency of the acceleration-available code in the CPU is not high, the scheduling manager modifies the compilation policy information, and sends the modified compilation policy information to the compiler.

Step 610. The compiler re-generates intermediate source code from common code in the source code according to the modified compilation policy information.

Step 611. The compiler compiles the re-generated intermediate source code into second CPU-executable code, and sends the second CPU-executable code to the scheduling manager.

Step 612. The compiler compiles the acceleration-available code into FPGA-executable code, and sends the FPGA-executable code to the scheduling manager.

Step 613. The scheduling manager loads the second CPU-executable code to the CPU for execution.

Step 614. The scheduling manager loads the FPGA-executable code to an FPGA for execution.

Step 615. The CPU and the FPGA perform code interaction.

In this embodiment, a compiler converts source code into intermediate source code, and then compiles the intermediate source code into CPU-executable code (no FPGA-executable code is obtained by means of compilation at a same time point). When there is code whose quantity of execution times is greater than a first preset threshold in the CPU-executable code, it indicates that the code may be executed by an FPGA, to improve execution efficiency. FPGA-executable code and new CPU-executable code are generated according to a recompilation method. Therefore, execution efficiency is higher, and hardware acceleration is implemented.

It should be noted that, in the foregoing embodiments, the compilation policy information may further be as follows.

If a quantity of execution times of code in a CPU in a specific period of time reaches a first preset threshold, the code is compiled into FPGA-executable code, and is loaded for running. Alternatively, statistics about execution duration of code are collected, and when the execution duration exceeds the first preset threshold, the code is compiled into FPGA-executable code, and is loaded for running.

In addition, to collect statistics about the quantity of times of executing, in the CPU, the code in source code, statistics function code may be intelligently inserted by the compiler during a compilation period, or a statistics instruction set may be extended in the CPU, statistics about the code are collected using the statistics instruction set, and the compiler automatically calls the extended statistics instruction set during compilation. Further, an external program or a manual intervention method may be used.

Further, when the FPGA receives the FPGA-executable code, but there is no enough resource in the FPGA to perform acceleration, it is determined whether a priority of a process 1 corresponding to the FPGA-executable code is higher than a priority (a priority may be preset according to a process) of a process 2 corresponding to executable code being executed in the FPGA. If yes, a resource occupied by a function, of the process 2, accelerated in the FPGA is released, and the resource is used by the process 1.

Figure 8:
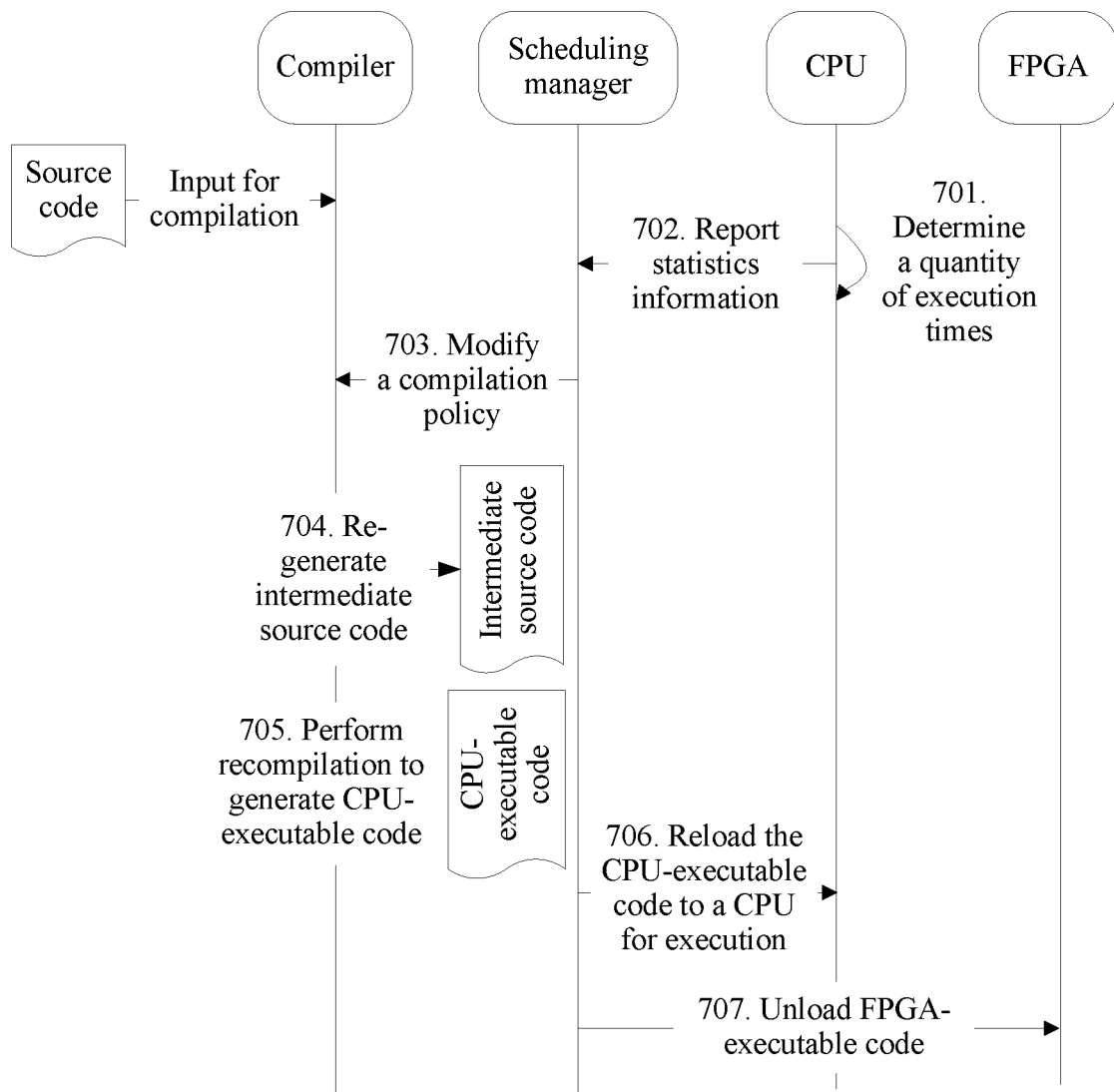
FIG. 8 is a schematic flowchart of a method according to an embodiment of the present disclosure.

For ease of understanding, the following describes a hardware acceleration method in an embodiment of the present disclosure in detail. Referring to FIG. 8, another hardware acceleration method in this embodiment of the present disclosure includes the following steps.

Step 701. A CPU determines a quantity of execution times of FPGA-executable code in an FPGA.

It should be noted that the quantity of execution times of the FPGA-executable code may also be obtained by the FPGA by means of statistics collection.

Before step 701, there is executable code separately running on the CPU and the FPGA, and original compilation policy information is that statistics about the quantity of execution times of the FPGA-executable code in the FPGA are collected during a period of time, and when the quantity of execution times is less than a first preset threshold (100), code corresponding to the FPGA-executable code is recompiled into CPU-executable code, and is loaded to the CPU for running.

Step 702. The CPU reports statistics information about the quantity of execution times to a scheduling manager.

Step 703. The scheduling manager modifies compilation policy information, and sends modified compilation policy information to a compiler.

When the quantity of execution times in the statistics information is less than 100, the compilation policy information is modified, and the modified compilation policy information is that the FPGA is not used for acceleration, and recompilation and loading are performed.

Step 704. The compiler re-converts source code corresponding to the FPGA-executable code into new intermediate source code according to the modified compilation policy information.

The source code is assumed to be:

```
void func2(bool c, FILE* file1, FILE* file2)
{
    if (c)
    {
        zip_func(file1);
        unzip_func(file2);
    }
}
```

Before step 701, intermediate source code converted from the source code may be:

```
void func2(bool c, FILE* file1, FILE* file2)
{
    if (c)
    {
        static int cnt=0;
            static int fpga_cnt=0;
        if (cnt++ < 100)
        {
            zip_func(file1);
            unzip_func(file2);
        }
        else
        {
            fpga_zip_func(file1);
            fpga_unzip_func(file2);
    fpga_cnt++;
    report_to_manager(fpga_cnt);
        }
    }
}
```

The intermediate source code re-generated by the compiler according to the modified compilation policy information may be:

```
void func2(bool c, FILE* file1, FILE* file2)
{
    if (c)
    {
        static int cnt=0;
        zip_func(file1);
        unzip_func(file2);
        if (cnt++ >= 100)
        {
            report_to_manager(cnt);
        }
    }
}
```

Step 705. The compiler compiles the new intermediate source code into CPU-executable code, and sends the CPU-executable code to the scheduling manager.

Step 706. The scheduling manager loads the CPU-executable code to the CPU for execution.

Step 707. The scheduling manager unloads the FPGA-executable code from the FPGA.

In this embodiment, when a quantity of execution times of executing code in the FPGA in a specific period of time is less than a first preset threshold, it indicates that execution efficiency of the FPGA is not high in this case. Therefore, recompilation is performed, and a CPU is used for execution such that execution efficiency can be improved, and hardware acceleration can be implemented.

For ease of understanding, the following describes a hardware acceleration method in an embodiment of the present disclosure using an actual application scenario.

A scheduling manager configures compilation policy information and hardware information (CPU and FPGA). The scheduling manager sends the compilation policy information and the hardware information to a compiler. The compiler receives source code. The compiler presets an acceleration-available code feature description library, and compares the source code with a feature rule in the acceleration-available code feature description library. The feature rule is as follows. If there is a matched code segment in the source code, it indicates that the code segment can be accelerated by an FPGA. After determining, according to the feature rule, a first code segment belonging to a common code type and a second code segment belonging to an acceleration-available code type, the compiler compiles the first code segment into CPU-executable code, and sends the CPU-executable code to a CPU using the scheduling manager, and compiles the second code segment into FPGA-executable code, and sends the FPGA-executable code to an FPGA using the scheduling manager.

Figure 9:
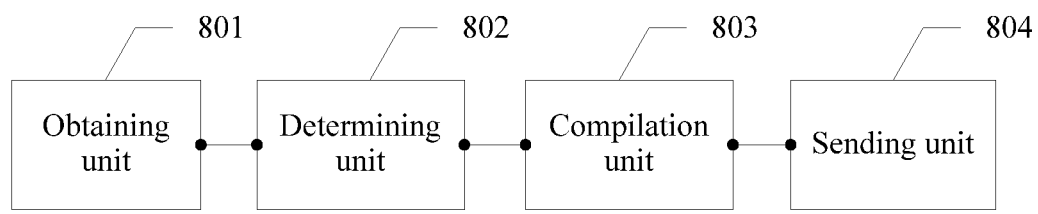
FIG. 9 is a schematic structural diagram of a compiler according to an embodiment of the present disclosure.

A hardware acceleration method in an embodiment of the present disclosure is described above, and a compiler in an embodiment of the present disclosure is described below. Referring to FIG. 9, the compiler in this embodiment of the present disclosure includes an obtaining unit 801 configured to obtain compilation policy information and source code, where the compilation policy information indicates that a first code type matches a first processor and a second code type matches a second processor, a determining unit 802 configured to analyze a code segment in the source code according to the compilation policy information, and determine a first code segment belonging to the first code type or a second code segment belonging to the second code type, a compilation unit 803 configured to compile the first code segment into first executable code, and compile the second code segment into second executable code, and a sending unit 804 configured to send the first executable code to the first processor, and send the second executable code to the second processor.

Optionally, the obtaining unit 801 is configured to obtain pre-configured compilation policy information from a local memory, or receive compilation policy information delivered by a scheduling manager.

The first processor and the second processor are any two of a CPU, an FPGA, a GPU, an NP, an ASIC, a CPLD, a PAL, or a GAL. It can be understood that the CPU, the GPU, and the NP are chips having a software programming capability, and the FPGA, the ASIC, the PAL, the GAL, and the CPLD are programmable logic devices.

If a priority of a process corresponding to the second code segment is higher than a priority of a process corresponding to executable code being executed in the second processor, optionally, the compiler in this embodiment further includes a first processing unit (not shown) configured to stop the executable code being executed in the second processor if a busy degree of the second processor is higher than a second preset threshold, and a second processing unit (not shown) configured to compile a code segment corresponding to the executable code being executed in the second processor into executable code matching the first processor, and send the executable code matching the first processor to the first processor.

Optionally, the sending unit 804 is configured to send the second executable code to the second processor using a scheduling manager, or the compilation unit 803 is further configured to add, to the second executable code, instruction information for calling the second processor, and the sending unit 804 is further configured to send the second executable code to a scheduling manager, and send the second executable code to the first processor using the scheduling manager such that the first processor sends the second executable code to the second processor after obtaining the instruction information.

When the first processor is a CPU, and the second processor is an FPGA, optionally, the determining unit 802 is configured to collect statistics about a quantity of loop execution times of the code segment in the source code and/or execution duration of the CPU; and if a parameter obtained by means of statistics collection exceeds a first preset threshold, determine that the code segment belongs to the second code segment; or if the parameter obtained by means of statistics collection does not exceed the first preset threshold, determine that the code segment belongs to the first code segment, the determining unit 802 is configured to compare the code segment in the source code with a feature rule of the second code segment; and if the code segment in the source code matches the feature rule of the second code segment, determine that the code segment is the second code segment; or if the code segment in the source code does not match the feature rule of the second code segment, determine that the code segment is the first code segment, or the determining unit 802 is configured to read acceleration identifier information in the source code, and determine, according to an indication of the acceleration identifier information, that code in the source code belongs to the first code segment or the second code segment, the determining unit 802 is configured to call a statistics instruction set to determine a quantity of loop execution times of the code segment in the source code and/or execution duration of the CPU using function code in the source code, or the determining unit 802 is configured to obtain a periodically-collected code execution statistics report to determine a quantity of loop execution times of the code segment in the source code and/or execution duration of the CPU.

Optionally, the compiler in this embodiment further includes a third processing unit (not shown) configured to add an interaction instruction to the first executable code and the second executable code such that the second processor returns an execution result of the second executable code to the first processor.

In this embodiment, a compiler compiles a code segment that matches a first processor and that is in source code into first executable code that can be executed by the first processor, and compiles a code segment that matches a second processor and that is in the source code into second executable code that can be executed by the second processor. The first executable code is sent to the first processor, and the second executable code is sent to the second processor. Therefore, executable code corresponding to a code segment in the source code is allocated to hardware with a higher matching degree for execution such that execution efficiency is higher, and hardware acceleration is implemented.

Figure 10:
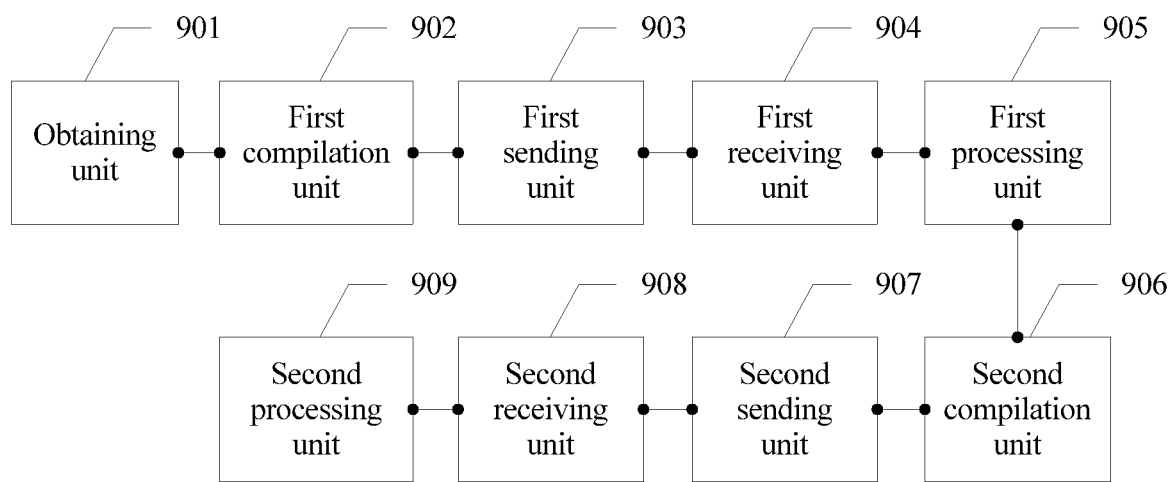
FIG. 10 is a schematic structural diagram of a compiler according to an embodiment of the present disclosure.

Referring to FIG. 10, a compiler in an embodiment of the present disclosure includes an obtaining unit 901 configured to obtain compilation policy information and source code, where the compilation policy information indicates that a first code type matches a first processor and a second code type matches a second processor, a first compilation unit 902 configured to compile, according to the compilation policy information, a code segment in the source code into first executable code matching the first processor, a first sending unit 903 configured to send the first executable code to the first processor, a first receiving unit 904 configured to receive first execution information that is obtained by means of statistics collection by the first processor and that is of the first executable code, a first processing unit 905 configured to determine, according to the first execution information, whether a code segment corresponding to the first executable code matches the second processor, a second compilation unit 906 configured to compile the code segment corresponding to the first executable code into second executable code if the first processing unit 905 determines, according to the first execution information, that the code segment corresponding to the first executable code matches the second processor, and a second sending unit 907 configured to send the second executable code to the second processor.

Optionally, the compiler in this embodiment further includes a second receiving unit 908 configured to receive, from the second processor, second execution information of executing the second executable code, and a second processing unit 909 configured to unload the second executable code from the second processor, and send, to the first processor, first executable code corresponding to the code segment corresponding to the second executable code if a matching degree between the second processor and a code segment corresponding to the second executable code is lower than an expected value according to the second execution information.

In this embodiment, a code segment in source code is compiled into first executable code matching a first processor. When a code segment corresponding to the first executable code matches a second processor, the code segment corresponding to the first executable code is compiled into second executable code, and the second executable code is received by the second processor. Therefore, execution efficiency is improved using different hardware to execute different types of code.

In addition, when efficiency of executing the second executable code in the second processor is not high, the second executable code is unloaded from the second processor, and a code segment corresponding to the second executable code is recompiled and then is executed by the first processor.

For ease of understanding, the following describes interaction between the units of the compiler in this embodiment using an application scenario.

A scheduling manager configures compilation policy information. The scheduling manager sends the compilation policy information to an obtaining unit, and the obtaining unit receives source code. The compilation policy information indicates that a first code type matches a first processor and a second code type matches a second processor. A code type includes acceleration-available code and common code. The acceleration-available code may be a CPU instruction, a code block, a function (module), and a source file. After the compilation policy information and the source code are obtained, a determining unit analyzes a code segment in the source code according to the compilation policy information, and determines a first code segment belonging to the first code type or a second code segment belonging to the second code type.

A compilation unit compiles the first code segment into first executable code, and a sending unit sends the first executable code to the first processor using the scheduling manager. Similarly, the compilation unit compiles the second code segment into second executable code. Because different execution logic (tasks, processes, threads, or the like) has different priorities, there may be a possibility that a priority of a process corresponding to the second code segment is higher than a priority of a process corresponding to executable code being executed in the second processor. When there is no enough resource in the second processor to execute the second executable code (that is, a first processing unit determines that a busy degree of the second processor is higher than a preset threshold), a resource occupied by the executable code being executed in the second processor is released (that is, the executable code being executed in the second processor is stopped). A second processing unit 806 compiles a code segment corresponding to the executable code being executed in the second processor into executable code matching the first processor, and sends the executable code matching the first processor to the first processor. In this way, the second processor has enough resources to execute the second executable code, and the second executable code is sent to the second processor.

Figure 11:
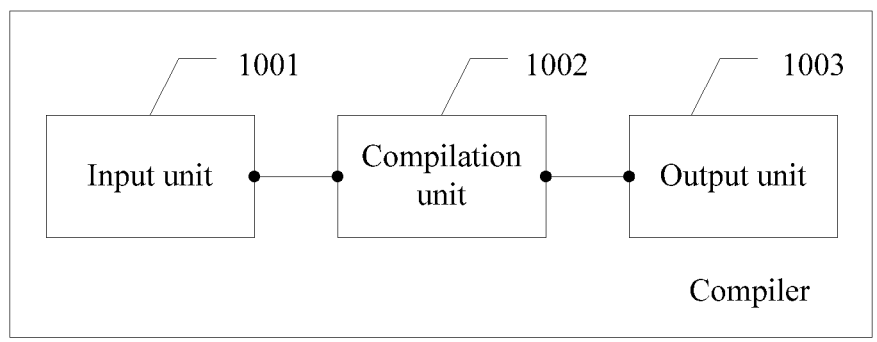
FIG. 11 is a schematic structural diagram of a compiler according to an embodiment of the present disclosure.

Referring to FIG. 11, a compiler in an embodiment of the present disclosure includes an input unit 1001, a compilation unit 1002, and an output unit 1003.

The input unit 1001 is configured to receive source code, compilation policy information, hardware information, and an acceleration-available code feature description library.

The compilation unit 1002 is configured to compile CPU-executable code and FPGA-executable code.

The output unit 1003 is configured to send the CPU-executable code and the FPGA-executable code.

Figure 12:
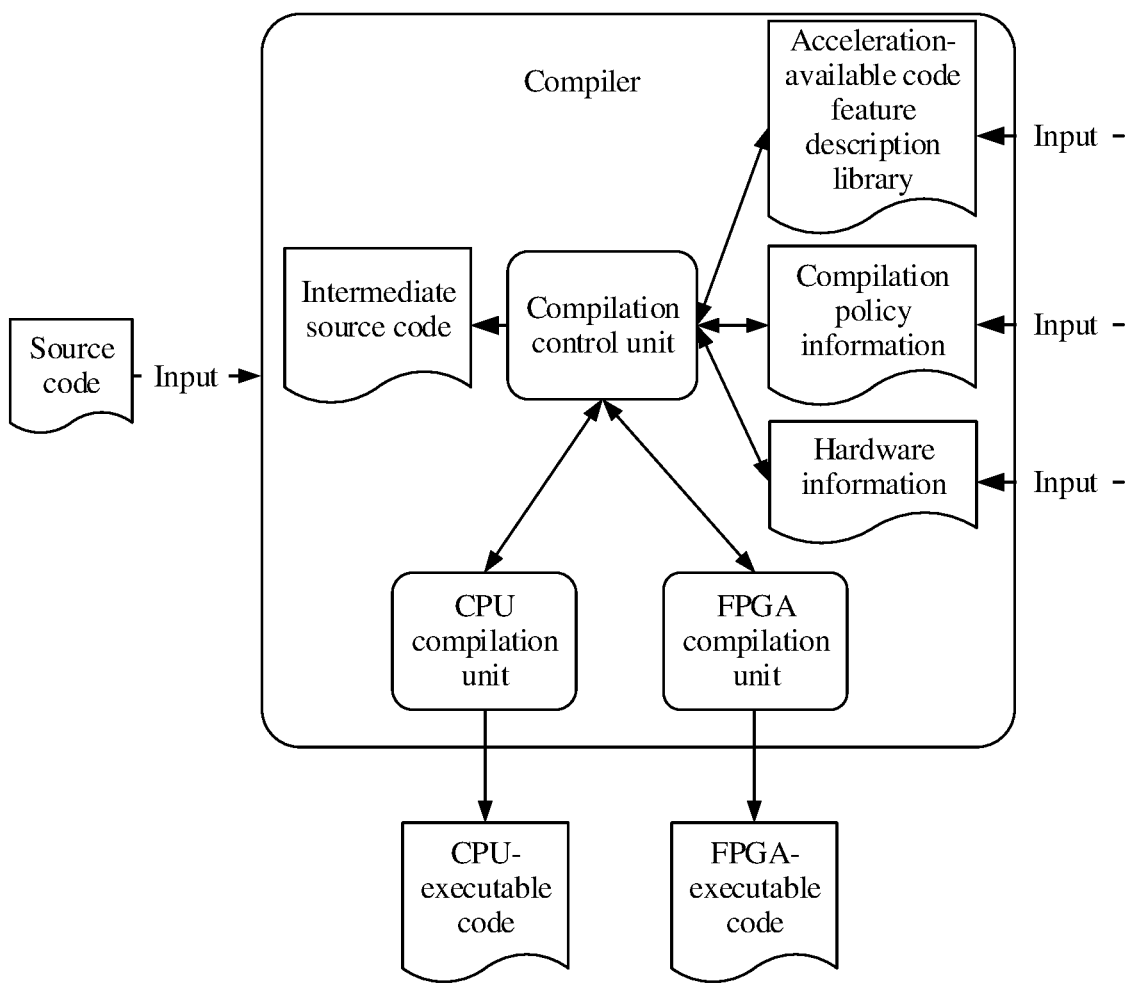
FIG. 12 is a schematic structural diagram of a compiler according to an embodiment of the present disclosure.

Referring to FIG. 12, the compiler has three core function components a compilation control unit, a CPU compilation unit, and an FPGA compilation unit.

The compilation policy information and the hardware information may be inputted using an external program, or may be operated by the compilation control unit.

The compilation control unit identifies and executes the compilation policy information, identifies and processes the acceleration-available code feature description library, increases or decreases a rule, and modifies a rule. The compilation control unit may further detect, according to the acceleration-available code feature description library, a compilation policy information, and the hardware information, whether there is acceleration-available code in the source code, and then generate intermediate source code according to a detection result.

The CPU compilation unit is configured to perform compilation to generate the CPU-executable code, and the FPGA compilation unit is configured to perform compilation to generate the FPGA-executable code. The FPGA compilation unit may directly perform compilation according to the source code or the intermediate source code, or may translate and convert acceleration-available code or the intermediate source code into logic language code, and then compile the logic language code into the FPGA-executable code.

It should be noted that one compilation control unit may manage one or more CPU compilation units, one compilation control unit may manage one or more FPGA compilation units, and one CPU compilation unit or one FPGA compilation unit may be managed by one or more compilation control units.

Figure 13:
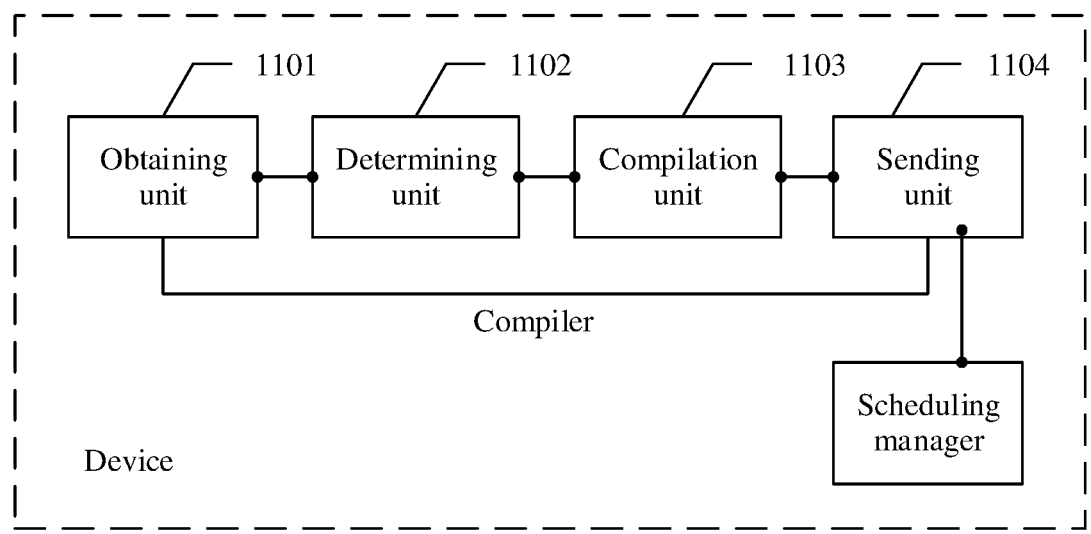
FIG. 13 is a schematic structural diagram of a device according to an embodiment of the present disclosure.

An embodiment of the present disclosure further provides a device. Referring to FIG. 13, the device in this embodiment of the present disclosure includes a compiler and a scheduling manager, where the compiler includes an obtaining unit 1101, a determining unit 1102, a compilation unit 1103, and a sending unit 1104.

The obtaining unit 1101 is configured to obtain compilation policy information and source code, where the compilation policy information indicates that a first code type matches a first processor and a second code type matches a second processor.

The determining unit 1102 is configured to analyze a code segment in the source code according to the compilation policy information, and determine a first code segment belonging to the first code type or a second code segment belonging to the second code type.

The compilation unit 1103 is configured to compile the first code segment into first executable code, and compile the second code segment into second executable code.

The sending unit 1104 is configured to send the first executable code and the second executable code to the scheduling manager.

The scheduling manager is configured to send the first executable code to the first processor, and send the second executable code to the second processor.

Optionally, the scheduling manager is further configured to configure the compilation policy information, and send the compilation policy information to the compiler.

The scheduling manager is further configured to, if a busy degree of the second processor is higher than a second preset threshold, after the compiler stops executable code being executed in the second processor, and compiles a code segment corresponding to the executable code being executed in the second processor into executable code matching the first processor, receive the executable code matching the first processor, and send the executable code matching the first processor to the first processor.

Further, optionally, if the first processor is a CPU, and the second processor is an FPGA, the determining unit 1102 is further configured to call a statistics instruction set to determine a quantity of loop execution times of the code segment in the source code and/or execution duration of the CPU using function code in the source code, or the scheduling manager is further configured to obtain a periodically-collected code execution statistics report to send the periodically-collected code execution statistics report to the compiler, and the determining unit 1102 is further configured to determine a quantity of loop execution times of the code segment in the source code and/or execution duration of the CPU according to the code execution statistics report, and that the determining unit 1102 is configured to determine a first code segment belonging to the first code type or a second code segment belonging to the second code type includes determining that the code segment belongs to the second code segment if the quantity of loop execution times or the execution duration of the CPU or both exceed a first preset threshold and determining that the code segment belongs to the first code segment if neither the quantity of loop execution times nor the execution duration of the CPU exceeds a first preset threshold.

Figure 14:
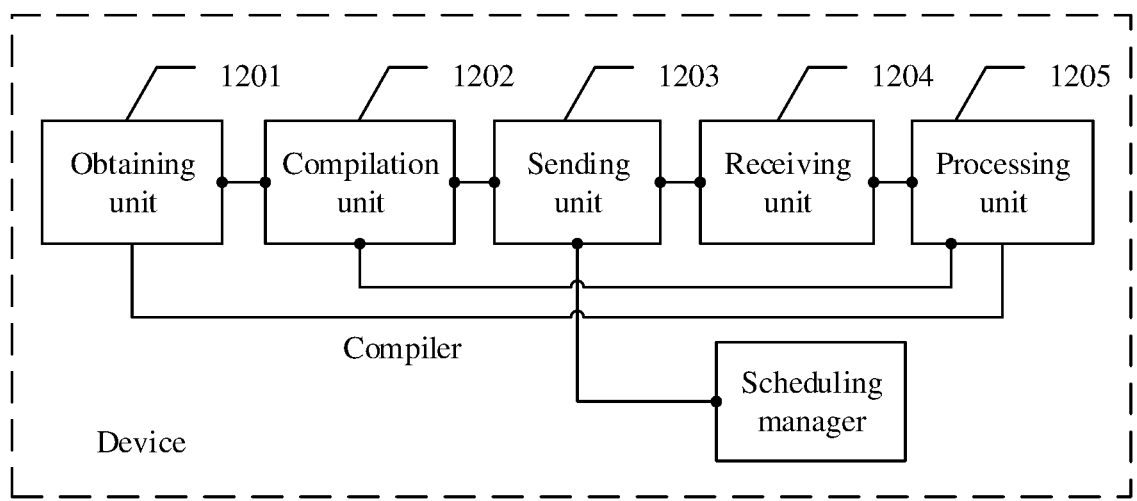
FIG. 14 is a schematic structural diagram of a device according to an embodiment of the present disclosure.

An embodiment of the present disclosure further provides a device. Referring to FIG. 14, the device in this embodiment of the present disclosure includes a compiler and a scheduling manager, where the compiler includes an obtaining unit 1201, a compilation unit 1202, a sending unit 1203, a receiving unit 1204, and a processing unit 1205.

The obtaining unit 1201 is configured to obtain compilation policy information and source code, where the compilation policy information indicates that a first code type matches a first processor and a second code type matches a second processor.

The compilation unit 1202 is configured to compile, according to the compilation policy information, a code segment in the source code into first executable code matching the first processor.

The sending unit 1203 is configured to send the first executable code to the first processor.

The receiving unit 1204 is configured to receive first execution information that is obtained by means of statistics collection by the first processor and that is of the first executable code.

The processing unit 1205 is configured to determine, according to the first execution information, whether a code segment corresponding to the first executable code matches the second processor.

The compilation unit 1202 is further configured to compile the code segment corresponding to the first executable code into second executable code if the processing unit 1205 determines, according to the first execution information, that the code segment corresponding to the first executable code matches the second processor.

The sending unit 1203 is further configured to send the second executable code to the scheduling manager.

The scheduling manager is configured to send the second executable code to the second processor.

Optionally, the scheduling manager is further configured to receive, from the second processor, second execution information of executing the second executable code, and if a matching degree between the second processor and a code segment corresponding to the second executable code is lower than an expected value according to the second execution information, unload the second executable code from the second processor, and send, to the first processor, first executable code corresponding to the code segment corresponding to the second executable code.

Figure 15:
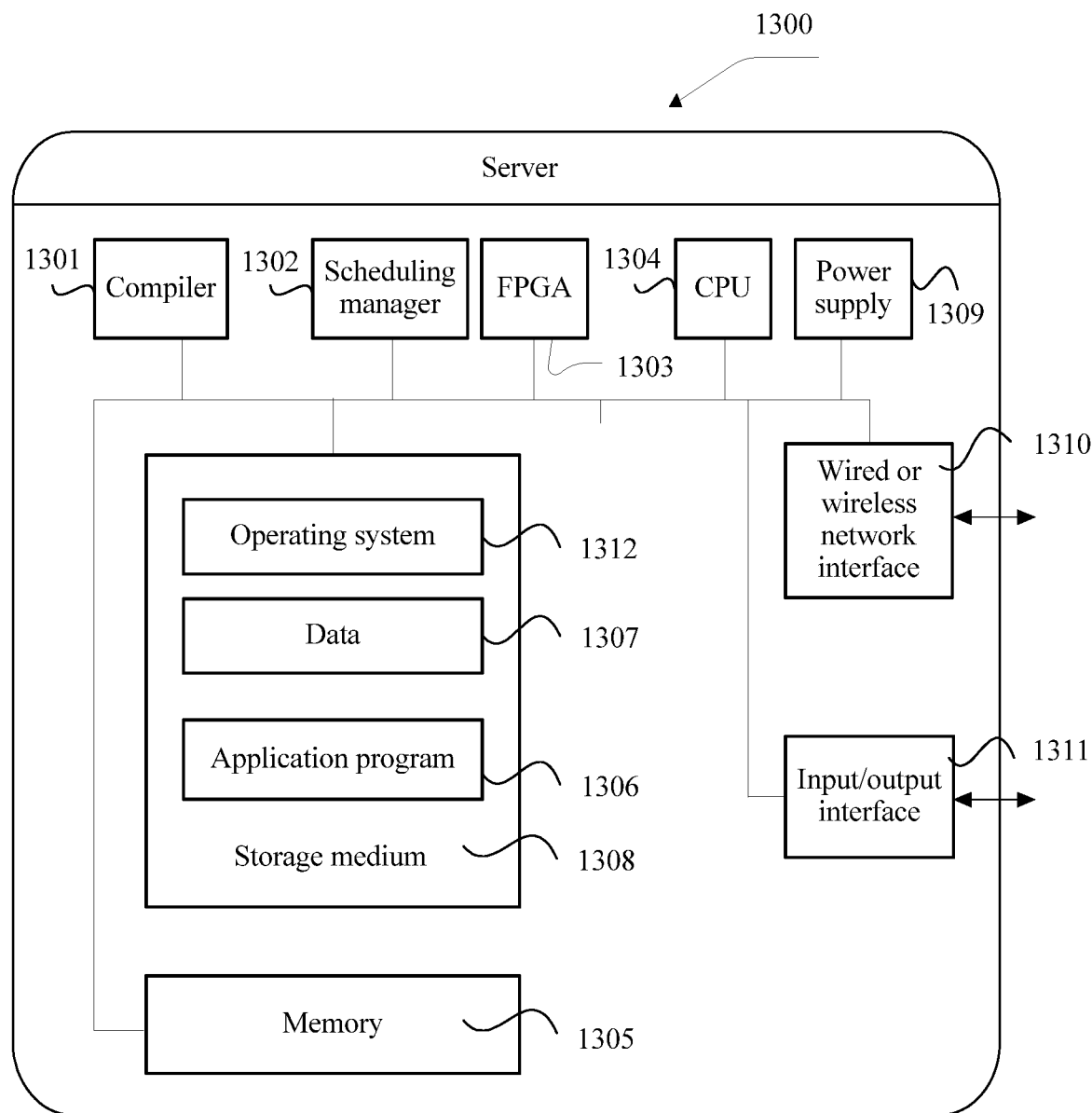
FIG. 15 is a schematic structural diagram of a server according to an embodiment of the present disclosure.

An embodiment of the present disclosure further provides a server 1300. Referring to FIG. 15, the server 1300 in this embodiment of the present disclosure includes the following.

A relatively great difference may be generated in the server 1300 because of a configuration or performance difference. The server 1300 may include a compiler 1301, a scheduling manager 1302, an FPGA 1303, at least one CPU 1304 (such as at least one processor) and memory 1305, and at least one storage medium 1308 (such as at least one mass storage device) for storing an application program 1306 or data 1307. The memory 1305 and the storage medium 1308 may be used for transient storage or persistent storage. A program stored in the storage medium 1308 may include at least one foregoing module (which is not shown in the diagram), and each module may include a series of instruction operations for the server. Further, the CPU 1304 may be disposed to communicate with the storage medium 1308, and execute, on the server 1300, a series of instruction operations in the storage medium 1308.

The server 1300 may further include at least one power supply 1309, at least one wired or wireless network interface 1310, at least one input/output interface 1311, and/or at least one operating system 1312 such as WINDOWS SERVER™, Mac OS X™, UNIX™, LINUX™, or FREEBSD™.

It should be noted that, in the foregoing device and compiler embodiments, the unit division is merely logical function division, but the present disclosure is not limited to the foregoing division, as long as corresponding functions can be implemented. In addition, specific names of the functional units are merely provided for the purpose of distinguishing the units from one another, but are not intended to limit the protection scope of the present disclosure.

In addition, a person of ordinary skill in the art may understand that all or a part of the steps of the method embodiments may be implemented by a program instructing relevant hardware. The program may be stored in a computer readable storage medium. The storage medium may include a read-only memory, a magnetic disk, or an optical disc.

The foregoing descriptions are merely examples of implementations of the present disclosure, but are not intended to limit the protection scope of the present disclosure. Any variation or replacement readily figured out by a person skilled in the art within the technical scope disclosed in the embodiments of the present disclosure shall fall within the protection scope of the present disclosure. Therefore, the protection scope of the present disclosure shall be subject to the protection scope of the claims.

What is claimed is:

1. A hardware acceleration method implemented by a compiler, wherein the hardware acceleration method comprises:
    obtaining compilation policy information and source code, wherein the compilation policy information indicates a first code type matches a first processor and a second code type matches a second processor;
    determining a first code segment belonging to the first code type and a second code segment belonging to the second code type according to the compilation policy information;
    compiling the first code segment into first executable code;
    sending the first executable code to the first processor;
    compiling the second code segment into second executable code; and
    sending the second executable code to the second processor,
    wherein when a priority of a first process corresponding to the second code segment is higher than a priority of a second process corresponding to a third executable code being executed in the second processor and before sending the second executable code to the second processor, the hardware acceleration method further comprises:
  stopping the third executable code when a busy degree of the second processor is higher than a first preset threshold;
  compiling a third code segment corresponding to the third executable code into a fourth executable code matching the first processor; and
  sending the fourth executable code to the first processor.

2. The hardware acceleration method of claim 1, wherein sending the second executable code comprises sending the second executable code to the second processor using a scheduling manager.

3. The hardware acceleration method of claim 1, wherein sending the second executable code comprises:
  adding, to the second executable code, instruction information for calling the second processor; and
  sending the second executable code to the first processor using a scheduling manager to enable the first processor to send the second executable code to the second processor after obtaining the instruction information.

4. The hardware acceleration method of claim 1, wherein the first processor is a central processing unit (CPU), wherein the second processor is a field-programmable gate array (FPGA), and wherein the hardware acceleration method further comprises:
  collecting statistics about at least one of a quantity of loop execution times of a code segment in the source code or execution duration of the CPU;
  obtaining a parameter using statistics collection;
  determining that the code segment belongs to the second code segment when the parameter exceeds a second preset threshold; and
determining that the code segment belongs to the first code segment when the parameter does not exceed the second preset threshold.

5. The hardware acceleration method of claim 4, wherein collecting the statistics comprises calling a statistics instruction set to determine at least one of the quantity of loop execution times or the execution duration of the CPU using a function code in the source code.

6. The hardware acceleration method of claim 4, wherein collecting the statistics comprises obtaining a periodically-collected code execution statistics report to determine at least one of the quantity of loop execution times or the execution duration of the CPU.

7. The hardware acceleration method of claim 1, wherein the first processor is a central processing unit (CPU), wherein the second processor is a field-programmable gate array (FPGA), and wherein the hardware acceleration method further comprises:
  comparing a code segment in the source code with a feature rule of the second code segment;
  determining that the code segment is the second code segment when the code segment matches the feature rule; and
  determining that the code segment is the first code segment when the code segment does not match the feature rule.

8. The hardware acceleration method of claim 1, wherein the first processor is a central processing unit (CPU), wherein the second processor is a field-programmable gate array (FPGA), and wherein the hardware acceleration method further comprises:
  reading acceleration identifier information in the source code; and
  determining, according to an indication of the acceleration identifier information, that code in the source code belongs to either the first code segment or the second code segment.

9. The hardware acceleration method of claim 1, further comprising:
  determining that the first code segment belongs to a main code segment and the second code segment is subordinate to the main code segment; and
  adding an interaction instruction to the first executable code and the second executable code to enable the second processor to return an execution result of the second executable code to the first processor.

10. The hardware acceleration method of claim 1, wherein the first code type or the second code type comprises an acceleration-available code.

11. The hardware acceleration method of claim 10, wherein the acerbation available code comprises a central processing unit (CPU) instruction, a code block, or a source file.

12. A hardware acceleration method, comprising:
  obtaining source code;
  compiling a code segment in the source code into first executable code matching a first processor, wherein the first executable code is running in the first processor; and
  when first execution information collected by the first processor for executing the first executable code is received, the hardware acceleration method further comprises:
    determining, according to the first execution information, that the code segment corresponding to the first executable code matches a second processor; and
    compiling the code segment into second executable code running in the second processor,
  wherein the first execution information comprises a first execution parameter of the first executable code in the first processor, wherein the first execution parameter includes an actual measurement value,
  wherein determining, according to the first execution information, that the code segment matches the second processor comprises determining that the code segment matches the second processor when the first execution parameter exceeds a first threshold,
  wherein the first threshold is determined according to estimating a second execution parameter of the code segment in the second processor, and
  wherein the first execution parameter is an execution duration of the first executable code in the first processor, and wherein the second execution parameter is an estimated execution duration of the second executable code in the second processor; or
  wherein the first execution parameter is a quantity of execution times of the first executable code in the first processor, and wherein the second execution parameter is an estimated quantity of execution times of the second executable code in the second processor.

13. The hardware acceleration method of claim 12, further comprising:
  unloading the first executable code from the first processor; and
  sending, to the second processor, the second executable code corresponding to the code segment.

14. The hardware acceleration method of claim 13, wherein when a priority of a first process corresponding to the second executable code is higher than a priority of a second process corresponding to a third executable code being executed in the second processor, and before sending, to the second processor, the second executable code corresponding to the code segment, the hardware acceleration method further comprises:
stopping the third executable code when a busy degree of the second processor is higher than a second threshold; and
   compiling a second code segment corresponding to the third executable code into a fourth executable code that matches the first processor.

15. The hardware acceleration method of claim 13, further comprising:
   determining, according to second execution information of executing the second executable code, that a matching degree between the second processor and the code segment corresponding to the second executable code is lower than an expected value;
   unloading the second executable code from the second processor; and
   sending, to the first processor, a third executable code corresponding to the code segment.

16. The hardware acceleration method of claim 13, wherein sending the second executable code to the second processor comprises sending the second executable code to the second processor using a scheduling manager.

17. The hardware acceleration method of claim 12, wherein the first processor is one of a central processing unit (CPU), a graphics processing unit (GPU), and a network processor (NP), and wherein the second processor is one of a field-programmable gate array (FPGA), a complex programmable logical device (CPLD), programmable array logic (PAL), or generic array logic (GAL).

18. The hardware acceleration method of claim 12, wherein the first processor is a central processing unit (CPU), and the second processor is a graphical processing unit (GPU).

19. A compiler comprising:
   a non-transitory computer readable storage medium configured to store computer-executable instructions; and
   a processor coupled to the non-transitory computer readable storage medium and configured to execute the computer-executable instructions to:
      obtain compilation policy information and source code, wherein the compilation policy information indicates a first code type matches a first processor and a second code type matches a second processor;
      determine a first code segment belonging to the first code type and a second code segment belonging to the second code type;
      compile the first code segment into first executable code;
      send the first executable code to the first processor;
      compile the second code segment into second executable code; and
      send the second executable code to the second processor,
      wherein when a priority of a first process corresponding to the second code segment is higher than a priority of a second process corresponding to a third executable code being executed in the second processor and before sending the second executable code to the second processor, the processor is further configured to execute the computer-executable instructions to:
         stop the third executable code when a busy degree of the second processor is higher than a first preset threshold;
         compile a third code segment corresponding to the third executable code into a fourth executable code matching the first processor; and
         send the fourth executable code to the first processor.

20. The compiler of claim 19, wherein the first processor is a central processing unit (CPU), wherein the second processor is a field-programmable gate array (FPGA), and wherein the processor is further configured to execute the computer-executable instructions to:
   collect statistics about at least one of a quantity of loop execution times of a code segment in the source code or execution duration of the CPU, obtain a parameter using statistics collection, determine that the code segment belongs to the second code segment when the parameter exceeds a second preset threshold, and determine that the code segment belongs to the first code segment when the parameter does not exceed the second preset threshold;
   compare the code segment with a feature rule of the second code segment, determine that the code segment is the second code segment when the code segment matches the feature rule, and determine that the code segment is the first code segment when the code segment does not match the feature rule; or
   read an acceleration identifier information in the source code and determine, according to an indication of the acceleration identifier information, that code in the source code belongs either to the first code segment or the second code segment.

21. The complier of claim 19, wherein the first code type or the second code type comprises an acceleration-available code.

22. The complier of claim 19, wherein the acerbation available code comprises a central processing unit (CPU) instruction, a code block, or a source file.

23. A hardware acceleration device comprising:
   a non-transitory computer readable storage medium configured to store computer-executable instructions; and
   a processor coupled to the non-transitory computer readable storage medium and configured to execute the computer-executable instructions to:
      obtain a source code;
      compile, a code segment in the source code into first executable code matching a first processor, wherein the first executable code is running in the first processor; and when first execution information collected by the first processor for executing the first executable code is received, the processor is further configured to execute the computer-executable instructions to:
         determine, according to the first execution information, that the code segment corresponding to the first executable code matches a second processor; and
         compile the code segment into second executable code, wherein the second executable code is running in the second processor,
      wherein the first execution information comprises a first execution parameter of the first executable code in the first processor, wherein the first execution parameter includes an actual measurement value,
      wherein determining, according to the first execution information, that the code segment matches a second processor comprises determining that the code segment matches the second processor when the first execution parameter exceeds a first threshold, wherein the first threshold is determined according to estimating a second execution parameter of the code segment in the second processor, and wherein the first execution parameter is an execution duration of the first executable code in the first processor, and wherein the second execution parameter is an estimated execution duration of the second executable code in the second processor; or wherein the first execution parameter is a quantity of execution times of the first executable code in the first processor, and wherein the second execution parameter is an estimated quantity of execution times of the second executable code in the second processor.

24. The hardware acceleration method of claim 23, wherein the processor is further configured to execute the computer-executable instructions to:

unload the first executable code from the first processor; and send, to the second processor, the second executable code corresponding to the code segment.

25. The hardware acceleration device of claim 24, wherein sending the second executable code to the second processor comprises sending the second executable code to the second processor using a scheduling manager.

26. The hardware acceleration device of claim 23, wherein the first processor is a central processing unit (CPU), and wherein the second processor is a graphics processing unit (GPU).

* * * * *